(12) United States Patent
Chang et al.

(10) Patent No.: US 7,573,944 B2
(45) Date of Patent: Aug. 11, 2009

(54) APPARATUS AND METHOD FOR CANCELING INTER-SYMBOL INTERFERENCE IN A BROADBAND WIRELESS COMMUNICATION SYSTEM

(75) Inventors: Young-Bin Chang, Hwasung-si (KR); Chi-Woo Lim, Suwon-si (KR); Pan-Yuh Joo, Seoul (KR); Jae-Weon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 643 days.

(21) Appl. No.: 11/254,681

(22) Filed: Oct. 20, 2005

(65) Prior Publication Data
US 2006/0087961 A1    Apr. 27, 2006

(30) Foreign Application Priority Data
Oct. 21, 2004   (KR) ............... 10-2004-0084336
Jan. 20, 2005   (KR) ............... 10-2005-0005202

(51) Int. Cl.
*H04L 27/28* (2006.01)
(52) U.S. Cl. ............................................. 375/260
(58) Field of Classification Search ............. 375/260, 375/290, 130; 370/503, 513, 206, 208; 455/203, 455/204, 210
See application file for complete search history.

(56) References Cited

U.S. PATENT DOCUMENTS 7,257,155 B2 *   8/2007   Huang ..................... 375/231
2005/0068886 A1 *   3/2005   Wang et al. ................ 370/210
2006/0034378 A1 *   2/2006   Lindskog et al. ........... 375/260
2006/0050776 A1 *   3/2006   Moon et al. ................ 375/222

FOREIGN PATENT DOCUMENTS

WO    WO 99/65180    12/1999

OTHER PUBLICATIONS

Zhang Zhao-Yang et al., A Novel OFDM Transmission Scheme with Length-Adaptive Cyclic Prefix, Journal of Zhejiang University Science, Jul. 2003.
Jan-Jaap van de Beek et al., Low-Complex Frame Synchronization in OFDM Systems, IEEE International Conference on Universal Personal Communications Record, Nov. 6-10, 1995, pp. 982-986.

* cited by examiner

*Primary Examiner*—Khai Tran
(74) *Attorney, Agent, or Firm*—The Farrell Law Firm, LLP

(57) ABSTRACT

An apparatus and method for canceling ISI in a broadband wireless communication system are provided. In a transmitter of the broadband wireless communication system, a controller acquires a CP length, a puncturing pattern, and a time sample interval according to a delay spread. A puncturer punctures coded data in the puncturing pattern. An IFFT processor IFFT-processes the punctured coded data and outputs sample data. A CP inserter generates an OFDM symbol by inserting a copy of a last part of the sample data before the sample data. Here, the length of the last part of the sample data is equal to the CP length. A D/A converter converts the OFDM symbol to an analog signal at a sampling rate determined by the time sample interval.

42 Claims, 26 Drawing Sheets

APPARATUS AND METHOD FOR CANCELING INTER-SYMBOL INTERFERENCE IN A BROADBAND WIRELESS COMMUNICATION SYSTEM

PRIORITY

This application claims priority under 35 U.S.C. § 119 to an application entitled "Apparatus And Method For Adjusting Cyclic Prefix Length In Orthogonal Frequency Division Multiplexing Communication System" filed in the Korean Intellectual Property Office on Oct. 21, 2004 and assigned Serial No. 2004-84336, and an application entitled "Apparatus And Method For Removing Intersymbol Interference In Broadband Wireless Communication System" filed in the Korean Intellectual Property Office on Jan. 20, 2005 and assigned Serial No. 2005-5202, the contents of each of which are incorporated herein by reference.

BACKGROUND OF THE INVENTION

1. Field of the Invention

The present invention relates generally to an Orthogonal Frequency Division Multiplexing (OFDM) communication system, and in particular, to an apparatus and method for canceling Inter-Symbol Interference (ISI) caused by a multipath channel.

2. Description of the Related Art

In recent years, studies have been actively conducted to provide a variety of services to users at high rates (at or above about 100 Mbps) in a $4^{th}$ generation (4G) system called a future-generation wireless communication system. Particularly, many techniques are required for the physical layer or its upper layers to provide high-speed service. The physical layer adopts multiplexing as a technology for dividing one circuit (a pair of a transmitter and a receiver in wireless communications) and establishing a plurality of communication paths (hereinafter, referred to as "channels") to enable simultaneous transmission/reception of independent signals, for high-speed data transmission. Classical multiplexing schemes are Frequency Division Multiplexing (FDM) and Time Division Multiplexing (TDM). Particularly, a case of FDM for high-speed data transmission, OFDM was approved and has been studied for use in multiplexing in the physical layer in the 4G wireless communication system under implementation.

OFDM is a special case of Multi-Carrier Modulation (MCM) in which prior to transmission a serial symbol sequence is converted to parallel symbol sequences and modulated to mutually orthogonal subcarriers.

The first MCM systems appeared in the late 1950's for military High Frequency (HF) radio communication, and OFDM with overlapping orthogonal subcarriers was initially developed in the 1970's. In view of difficulty of maintaining orthogonal modulation between multiple carriers, OFDM has limitations in applications to real systems.

However, in 1971, Weinstein, et al. proposed an OFDM scheme that applies Discrete Fourier Transform (DFT) to parallel data transmission as an efficient modulation/demodulation process, which was a driving force behind the development of OFDM. Although hardware complexity was an obstacle to the widespread use of OFDM, recent advances in digital signal processing technology including Fast Fourier Transform (FFT) and Inverse Fast Fourier Transform (IFFT) have enabled OFDM implementation. Also, the introduction of a guard interval and a cyclic prefix (CP) as a specific guard interval further mitigated adverse effects of multipath propagation and delay spread.

Due to its feasibility for high-speed data transmission, OFDM was adopted as a standard for fast Wireless Local Area Networks (WLAN) based on the IEEE 802.11a and HIPERLAN/2, IEEE 802.16 Broadband Wireless Access (BWA), and Digital Audio Broadcasting (DAB) standards in the field of wireless communications, and as a standard for Asymmetric Digital Subscriber line (ADSL) and Very high-data rate Digital Subscriber Line (VDSL).

FIG. 1 illustrates the principle of OFDM using a plurality of subcarriers.

If a signal is transmitted on a radio channel without dividing a carrier with a broad bandwidth into carriers with smaller bandwidths, it has a high bit error probability due to multipath fading and Doppler spread. This problem is solved at the cost of very high receiver complexity and difficulty in receiver implementation. Therefore, the carrier is divided into smaller frequency bands $f_1, f_2, \ldots, f_N$, as indicated by reference numeral 101. In this case, highly accurate band-pass filters are required in the frequency domain to distinguish the bandwidths of adjacent carriers from each other. Moreover, a plurality of oscillators are used to generate the carriers. Hence, this method is not viable for real systems.

Reference numeral 102 denotes the frequency spectral characteristics of an OFDM signal. Although a plurality of subcarriers transports data in a manner similar to the signal 101, neither band-pass filters for band separation nor oscillators for generating subcarrier frequencies are required. As described before, the generation of the subcarriers by IFFT in the baseband of a transmitter brings the same effects as the carrier generation for the signal 101, and FFT based on the orthogonality between subcarriers at a receiver facilitates separation of subcarriers from one another without device complexity. One thing to note regarding OFDM is that an interference signal from an adjacent subcarrier should have of a near-zero value at points $f_1, f_2, \ldots, f_N$ in the OFDM signal 102, for reliable demodulation.

Reference numeral 103 denotes a time-domain discrete signal created by IFFT-processing the frequency-domain OFDM signal 102. The discrete signal is expressed as Equation (1):

$$x[n] = \sum_{k=1}^{N} X[k]\exp\left(-2j\pi k \frac{n}{N}\right) \quad (1)$$

where x[n] denotes the time-domain OFDM discrete complex signal having n time-domain samples after IFFT. The variable n ranges from 1 to N. X[k] denotes a frequency-domain discrete complex signal fed as an IFFT input and k is an index indicating the number of the discrete complex signal. N denotes the total number of subcarriers or the number of the time-domain samples, exp( ) denotes an exponential function, and j in the bracket is a complex number. The time-domain signal x[n] may assume an unexpected waveform depending on the amplitude of the transmission data X[k] multiplied by the subcarriers, as indicated by reference numeral 103, and it may have a very large amplitude.

FIG. 2 is a block diagram of a transmitter and a receiver in a typical OFDM wireless communication system.

Referring to FIG. 2, the transmitter includes an encoder 202, a modulator 203, a serial-to-parallel (S/P) converter 204, an IFFT processor 205, a parallel-to-serial (P/S) converter 206, a Cyclic Prefix (CP) inserter 207, and a Radio Frequency (RF) processor 208. The receiver includes an RF processor 210, a CP remover 211, an S/P converter 212, an FFT processor 213, an equalizer 214, a P/S converter 215, a demodulator 216, and a decoder 217.

For transmission from the transmitter, the encoder 202 channel-encodes input information bits at a coding rate to render a transmission signal to be robust on a radio channel. The modulator 203 modulates the coded data according to a modulation scheme. The modulation scheme can be Quadrature Phase Shift Keying (QPSK), 16-ary Quadrature Amplitude Modulation (16QAM), or 64QAM. The S/P converter 204 parallelizes the serial modulation symbol sequence.

The IFFT processor 205 IFFT-processes the parallel data to time-domain sample data. The P/S converter 206 serializes the parallel IFFT data. The CP inserter 207 inserts a CP into the parallel sample data to eliminate ISI caused by the multipath fading of the radio channel. While at first, null data was inserted for a initial period of time as a guard interval, a cyclic prefix or cyclic postfix is now used as the guard interval. The cyclic prefix is formed by inserting a copy of some last bits of a time-domain OFDM symbol before the start of the valid OFDM symbol and the cyclic postfix is formed by inserting a copy of some first bits of a time-domain OFDM symbol after the end of the valid OFDM symbol. The data stream with the guard interval is an OFDM symbol transmitted on a radio channel. Herein, it is assumed that the cyclic prefix is used as the guard interval.

The RF processor 208 converts the digital signal received from the CP inserter 207 to an analog signal, upconverts the analog baseband signal to a transmittable RF signal, and transmits the RF signal on a radio channel 209. During the transmission, the signal experiences multipath fading, a physical phenomenon inherent to the spatial and frequency nature of the radio channel. The resulting ISI is not eliminated by the inserted CP alone.

For reception at the receiver, the RF processor 210 downconverts an RF signal that has experienced the radio channel 209 to a baseband signal and converts the analog baseband signal to time-domain sample data. The CP remover 211 removes the CP from the sample data and outputs a valid OFDM symbol. The S/P converter 212 parallelizes the serial data received from the CP remover 211. The FFT processor 213 FFT-processes the parallel data to frequency-domain data.

The equalizer 214 compensates the FFT data for noise generated on the radio channel 209. The P/S converter 215 converts the equalized parallel data to serial data. The demodulator 216 demodulates the serial data according to a demodulation scheme. The decoder 217 channel-decodes the demodulated data at a coding rate, thereby recovering information data.

The structure of the OFDM symbol will be described in more detail. FIG. 3 illustrates a typical OFDM symbol in the time-frequency domain.

Referring to FIG. 3, the OFDM symbol is divided into a guard interval and a data interval. The data interval is filled with valid data after IFFT, and the guard interval has data inserted to protect the OFDM symbol against multipath delay-caused contamination. As stated before, although the original guard interval was zero data, a copy of a last part of an OFDM symbol is now used as the guard interval. The length of the guard interval is a ratio of one OFDM symbol, such as 1/64, 1/32, 1/16, 1/8, or 1/4. A guard interval length is determined by taking into account a maximum multipath delay in an initial system design.

The OFDM symbol is represented in the frequency domain as a plurality of frequency components $f_1, f_2, \ldots, f_N$. Each of the frequency signals has a guard interval being a copy as its last part. These guard intervals form the CP of the OFDM symbol. Some of the frequency components $f_1, f_2, \ldots, f_N$ are simply added to the start of the OFDM symbol, and other frequency components are not added. In other words, no signal distortion occurs in the frequency domain. Instead of the CP, the use of zeroes or any other signal as the guard interval adds different frequency components to the OFDM symbol in the frequency domain. As a result, the orthogonality between the subcarriers may be impaired. Past studies already revealed this advantage of the CP.

FIG. 4 illustrates multipath delay-caused data contamination of a downlink OFDM symbol in the typical OFDM communication system. In general, a downlink OFDM symbol arrives at a downlink receiver from different paths. Two major paths 410 and 420 that most significantly affect data recovery are shown.

Referring to FIG. 4, the OFDM symbol is divided into a CP and data. The CP and a last part of the data are labeled with the same numeral because the CP is a copy of the last data part. In view of the multipath delay, an OFDM symbol 411 arrives at the receiver in the first path 410 earlier than an OFDM symbol 422 in the second path 420 by a time delay 421. A second symbol 414 in the first path 410 overlaps with the first symbol 422 in the second path 420. This overlap acts as so-called ISI to the second symbol 414.

On the part of the second symbol 414, the overlap with the first symbol 422 in the second path is a delay spread 423. If the delay spread 423 is shorter than a CP 412 of the OFDM symbol 414, it does not affect data recovery gain. On the other hand, if the delay spread 423 is longer than the CP 412, data contamination 413 occurs, functioning as noise in data recovery of the second symbol 414. As a result, a data reception gain is usually decreased.

Although the data contamination is prevented by lengthening the CP, the increased CP length makes symbol synchronization difficult and decreases frequency efficiency. Most of methods proposed so far use an additional device or algorithm for eliminating data contamination components in a receiver, or channel coding designed to be very robust against contamination in a transmitter. These conventional methods commonly suffer from increased receiver complexity and decreased frequency efficiency.

FIG. 5 illustrates multipath delay-caused data contamination of an uplink OFDM symbol in the typical OFDM communication system.

Referring to FIG. 5, timing synchronization is acquired between a Base Station (BS) and Subscriber Stations (SS) to enable propagation of successive OFDM symbols in the first path on the uplink. However, the successive transmission of OFDM symbols is not ensured for the second path. To be more specific, an OFDM symbol 513 from a user 512 (user #1) is received at the BS, followed by an OFDM symbol 517 from a user 516 (user #2) in a first path 510. However, an OFDM symbol 522 from user #1 and an OFDM symbol 524 from user #2 may arrive at the BS with different time delays from a second path 520. For example, the OFDM symbol 522 from user #1 is received at the BS from the second path 520 with a long time delay 521, whereas the OFDM symbol 524 from user #2 at a different location within the same cell is received at the BS with a short time delay 523 from the second path 520.

Due to the time delay 521 in the second path 520, the data from user #1 suffers from phase discontinuity 511 and thus has a decreased bit error performance. The data from user #2 is subject to contamination due to the delay spread resulting from the time delay 521.

SUMMARY OF THE INVENTION

These problems for the uplink can also be solved by the above-described methods, but at the cost of increased receiver complexity and decreased frequency efficiency. Compared to the downlink, because the uplink experiences a different delay spread from each user, it is difficult to indiscriminately compensate for uplink data contamination for users.

An object of the present invention is to substantially solve at least the above problems and/or disadvantages and to provide at least the advantages below. Accordingly, an object of the present invention is to provide an apparatus and method for eliminating the multipath channel-caused phase discontinuity of an OFDM symbol in an OFDM communication system.

Another object of the present invention is to provide an apparatus and method for eliminating the multipath channel-caused data contamination of an OFDM symbol in an OFDM communication system.

A further object of the present invention is to provide an apparatus and method for changing the CP length of an OFDM symbol adaptively according to a multipath channel state in an OFDM communication system.

Still another object of the present invention is to provide an apparatus and method for inserting a Zero Postfix (ZP) of a predetermined length in a last part of an OFDM symbol according to a multipath channel state in an OFDM communication system.

Yet another object of the present invention is to provide an apparatus and method for maintaining an OFDM symbol at a fixed length by adjusting its sampling rate when its guard interval length is changed, and transmitting the OFDM symbol of the fixed length in an OFDM communication system.

The above objects are achieved by providing an apparatus and method for canceling ISI in a broadband wireless communication system.

According to one aspect of the present invention, in a transmitter of the broadband wireless communication system, a controller acquires a CP length, a puncturing pattern, and a time sample interval according to a delay spread. A puncturer punctures coded data according to the puncturing pattern. An IFFT processor IFFT-processes the punctured coded data and outputs sample data. A CP inserter generates an OFDM symbol by inserting a copy the same length as a last part of the sample data before the sample data. Here, the last part is of the CP length. A D/A converter converts the OFDM symbol to an analog signal at a sampling rate determined by the time sample interval.

According to another aspect of the present invention, in a transmission method in a broadband wireless communication system, a CP length, a puncturing pattern, and a time sample interval are acquired according to a delay spread. Coded data is punctured according to the puncturing pattern, and sample data is generated by IFFT-processing the punctured coded data. An OFDM symbol is generated by inserting a copy of a last part of the sample data before the sample data. Here, the last part is the same length as the CP length, converted to an analog signal at a sampling rate determined by the time sample interval, and transmitted.

According to a further aspect of the present invention, in a transmitter of a broadband wireless communication system, a controller acquires a zero postfix (ZP) length, a puncturing pattern, and a time sample interval according to a delay spread. A puncturer punctures coded data in the puncturing pattern. An IFFT processor IFFT-processes the punctured coded data and outputs sample data. A CP inserter inserts a CP in the sample data. A ZP inserter generates an OFDM symbol by inserting zero samples of the ZP length after the CP-inserted sample data. A D/A converter converts the OFDM symbol to an analog signal at a sampling rate determined by the time sample interval.

According to still another aspect of the present invention, in a transmission method in a broadband wireless communication system, a ZP length, a puncturing pattern, and a time sample interval are acquired according to a delay spread. Coded data is punctured according to the puncturing pattern. Sample data is generated by IFFT-processing the punctured coded data. A CP is inserted in the sample data. An OFDM symbol is generated by inserting zero samples of the ZP length after the CP-inserted sample data, converted to an analog signal at a sampling rate determined by the time sample interval, and transmitted.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is intended to provide a technique for adaptively changing the configuration of an OFDM symbol according to a multipath channel state by adjusting a CP length or inserting a ZP in a last part of the OFDM symbol. Because the change of an OFDM symbol length increases receiver complexity, the OFDM symbol length is fixed in the time domain. For instance, for a long multipath delay spread, the CP and ZP are lengthened and the sample interval of the OFDM symbol is adjusted to be narrow, thus keeping the OFDM symbol length unchanged. On the contrary, for a short delay spread, the CP and ZP are shortened and the sample interval is adjusted to be wide. The CP length and the ZP length can be measured in the number of samples within the CP and ZP intervals. Therefore, adjusting the CP and ZP lengths is equivalent to adjusting the number of CP samples and ZP samples in sample data after IFFT.

Figure 6:
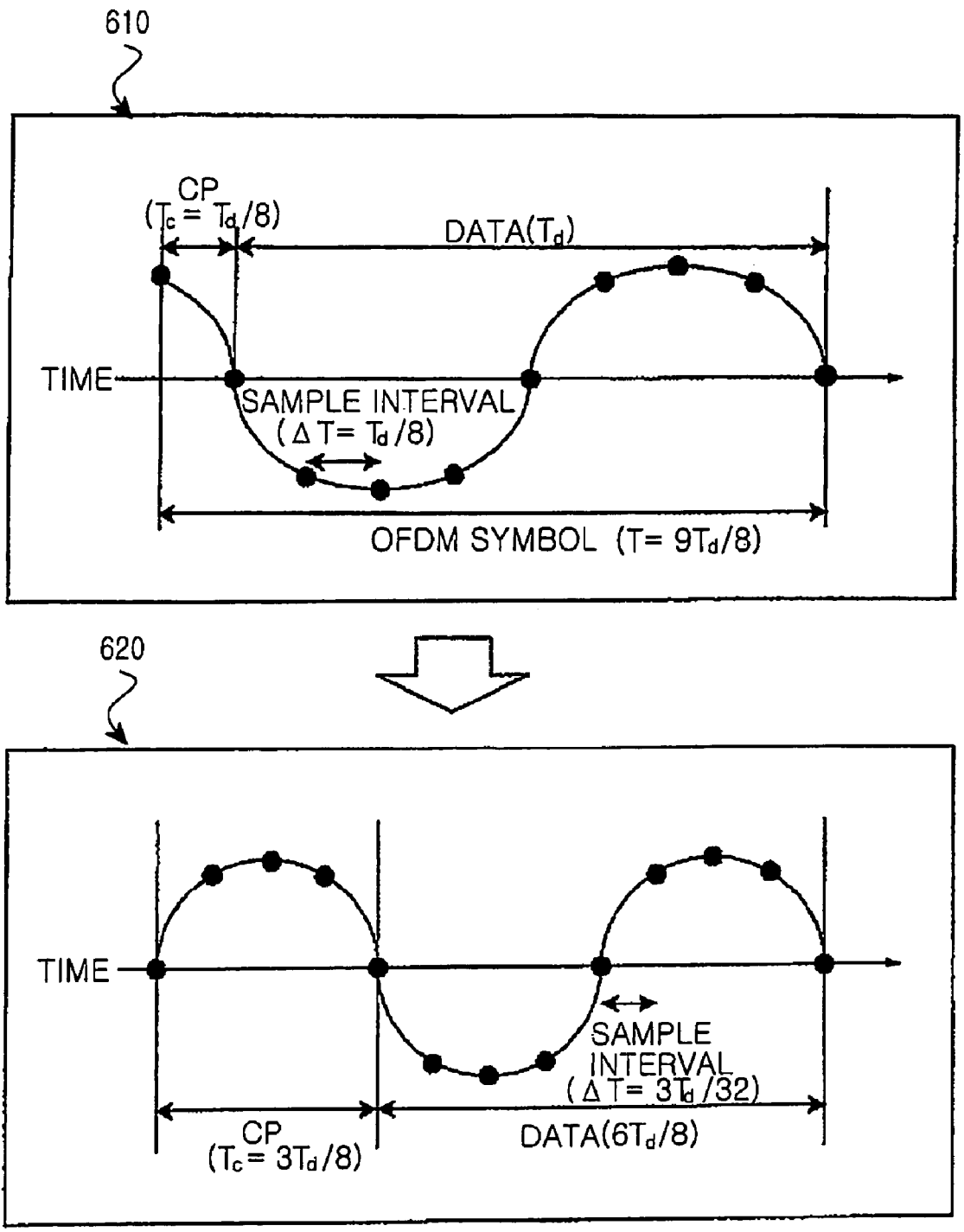
FIG. 6 illustrates a method of canceling downlink ISI in an OFDM communication system according to the present invention.

FIG. 6 illustrates a method of canceling downlink ISI in an OFDM communication system according to the present invention.

Before describing the downlink ISI cancellation, variables used herein are defined as follows.

$N_{FFT}$: the number of OFDM subcarriers (i.e. FFT size);
$T_d$: the time duration of data in an OFDM symbol;
$T_c$: a CP length;
G: the ratio of $T_c$ to $T_d$ ($T_c/T_d$);
T: the duration of a reference OFDM symbol;
$\Delta T$: a sample interval in the time domain; and
$1/\Delta T$: a sampling rate (the reciprocal of $\Delta T$).

If the CP length is increased by M times, the sample interval $\Delta T$ is as shown in Equation (2):

$$\Delta T = \frac{T - MT_c}{N_{FFT}} = \frac{T - MGT_d}{N_{FFT}} \qquad (2)$$

The sample interval $\Delta T$ described by Equation (2) is a significant parameter in adjusting a CP length according to the present invention. For notational simplicity, Specific values of the above variables are shown in FIG. 6.

Figure 1:
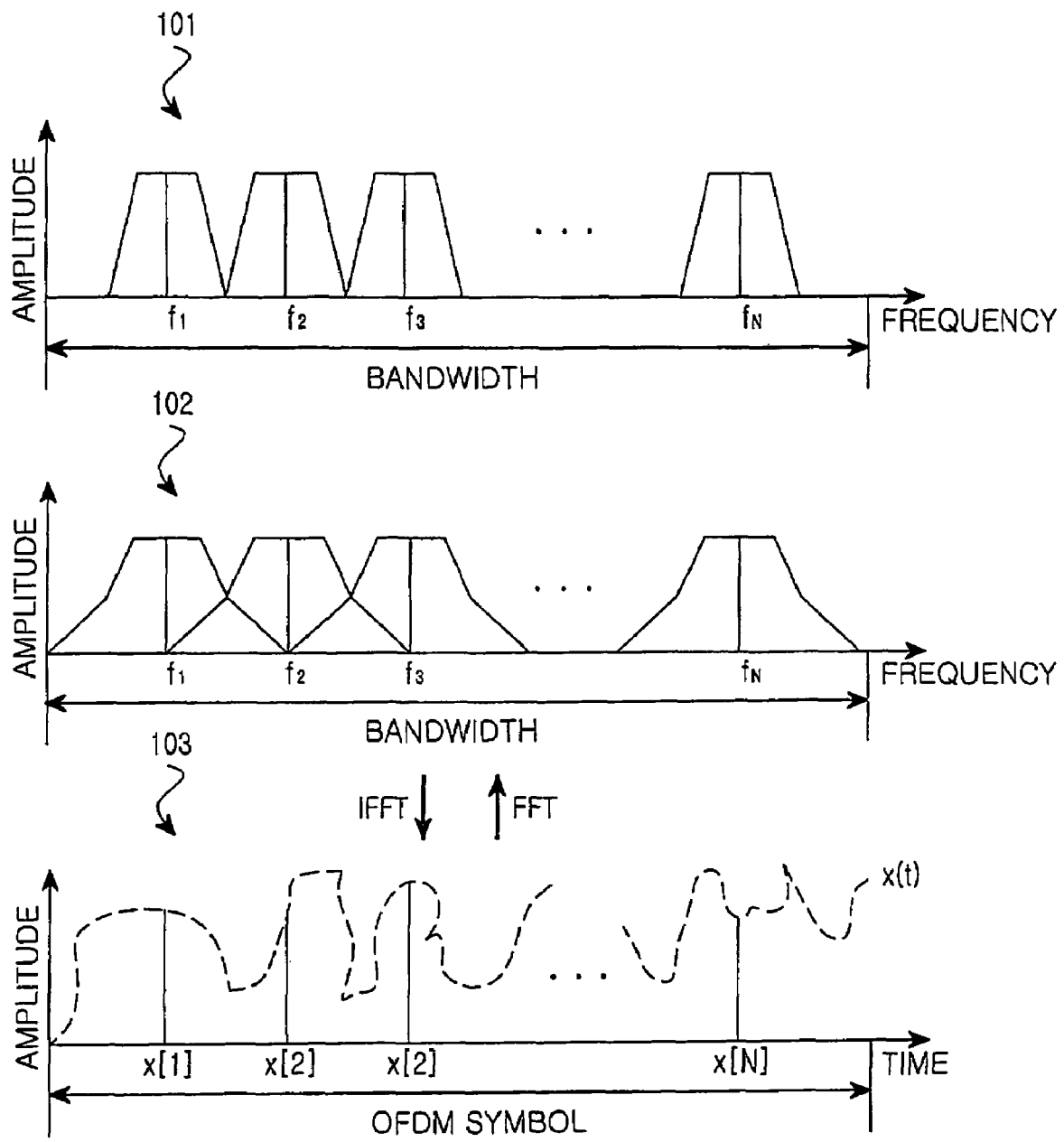
FIG. 1 illustrates the principle of OFDM using a plurality of subcarriers.
Figure 4:
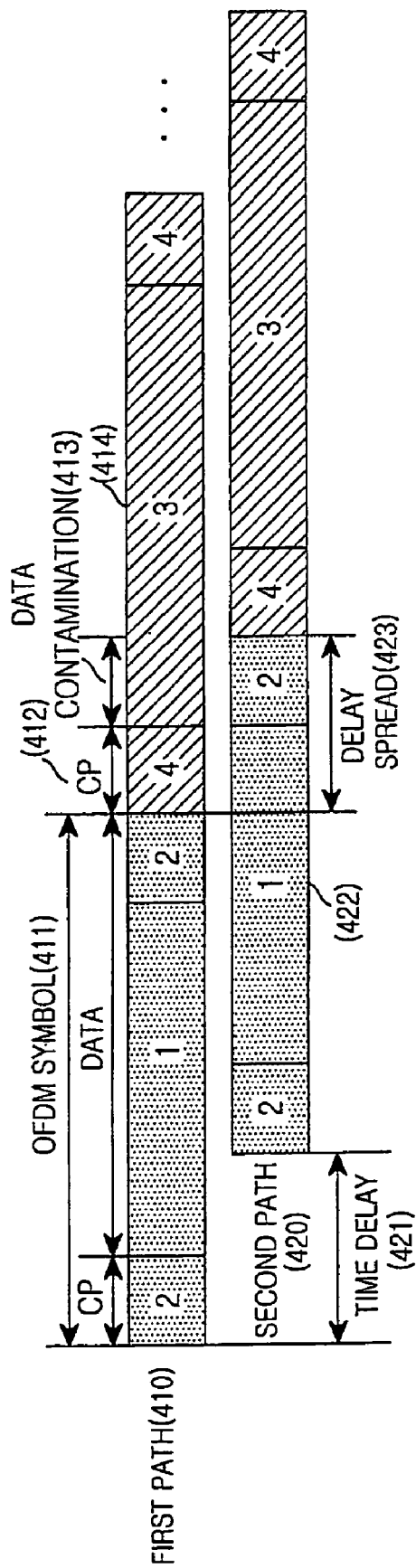
FIG. 4 illustrates multipath delay-caused data contamination of a downlink OFDM symbol in the typical OFDM communication system.

Referring to FIG. 6, for an OFDM symbol 610, $N_{FFT}=8$, the time duration of data in the OFDM symbol after IFFT is $T_d$, and $T_c=T_d/8$. Thus, $G=1/8$. Since $N_{FFT}$ is equal to the number of time-domain samples as stated before with reference to FIG. 1, $\Delta T=T_d/N_{FFT}=T_d/8$. Thus, the length of the OFDM symbol 610 is $T=9T_d/8$. Conventionally, once a CP length is decided, it is fixed irrespective of the characteristics of a multipath fading channel. As described before with reference to FIG. 4, the CP must be longer than a noise signal introduced from multiple paths in order to achieve the bit error probability that ensures an acceptable or higher performance. If the multipath noise signal is three times the length of the CP, the CP length should be triple (increased by a factor of 3) that of an OFDM symbol 620.

Regarding the OFDM symbol 620, for the tripled CP length ($M=3$, $T_c=3T_d/8$), the data interval is $6T_d/8$ since the original OFDM symbol length is $T=9T_d/8$. With a sample interval of $T_d/8$, the number of time-domain samples is limited to 6, causing distortion to the data of the OFDM symbol. The distortion can be prevented by setting the number of the samples of the data interval to $N_{FFT}$, 8. In other words, the sample interval is adjusted according to Equation (2). The decrease of $\Delta T$ from $T_d/8$ in the OFDM symbol 610 to $3T_d/32$ in the OFDM symbol 620 enables transmission of eight time samples in the data interval of $6T_d/8$. In this way, the CP length can be increased by a factor of 3 without data loss. The OFDM symbol length is kept at $T=9T_d/8$ and thus there are no synchronization-associated problems caused by the change of the OFDM symbol length. Based on the fact that the time-domain sample interval is the reciprocal of the sampling rate, the sample interval is reduced by increasing the sampling rate. In real implementation, the sample interval is changed by the sampling rate of a digital-to-analog (D/A) converter and an analog-to-digital (A/D) converter. Since a typical transmitter/receiver is provided with these devices, there is no need for procuring an additional complex device.

Figure 7:
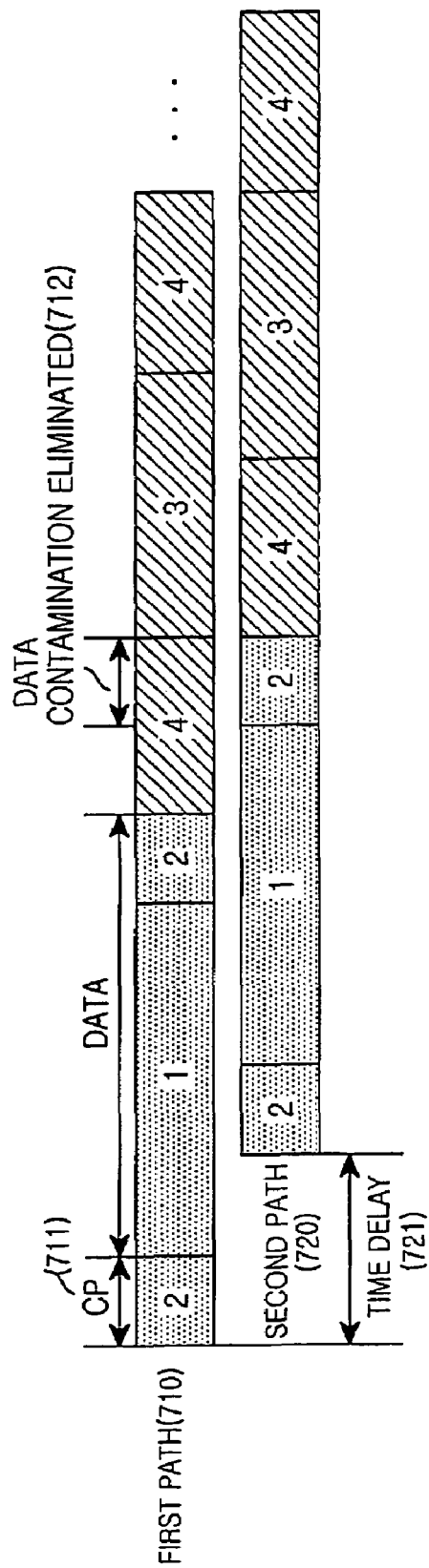
FIG. 7 illustrates the principle of downlink ISI cancellation by the method illustrated in FIG. 6 in the OFDM communication system according to the present invention.

FIG. 7 illustrates the principle of downlink ISI cancellation by the method illustrated in FIG. 6 in the OFDM communication system according to the present invention.

Referring to FIG. 7, each OFDM symbol is divided into a CP and data, and the CP and a last part of the data are labeled with the same numeral because the CP is a copy of the last data part. Due to a multipath delay, OFDM symbols arrive at the receiver from a second path 720 later than those from a first path 710 by a time delay 721. A second symbol in the first path 710 partially overlaps with a first symbol in the second path 720. This overlap is a delay spread on the part of the second symbol in the first path 710.

If the delay spread is longer than the CP of the second symbol, ISI does not occur. As described earlier with reference to FIG. 6, downlink ISI is cancelled by increasing the CP length of the second symbol in the first path 710 and decreasing the time duration of the data so that a delay spread 712 is equal to or less than the increased CP length.

Figure 8A:
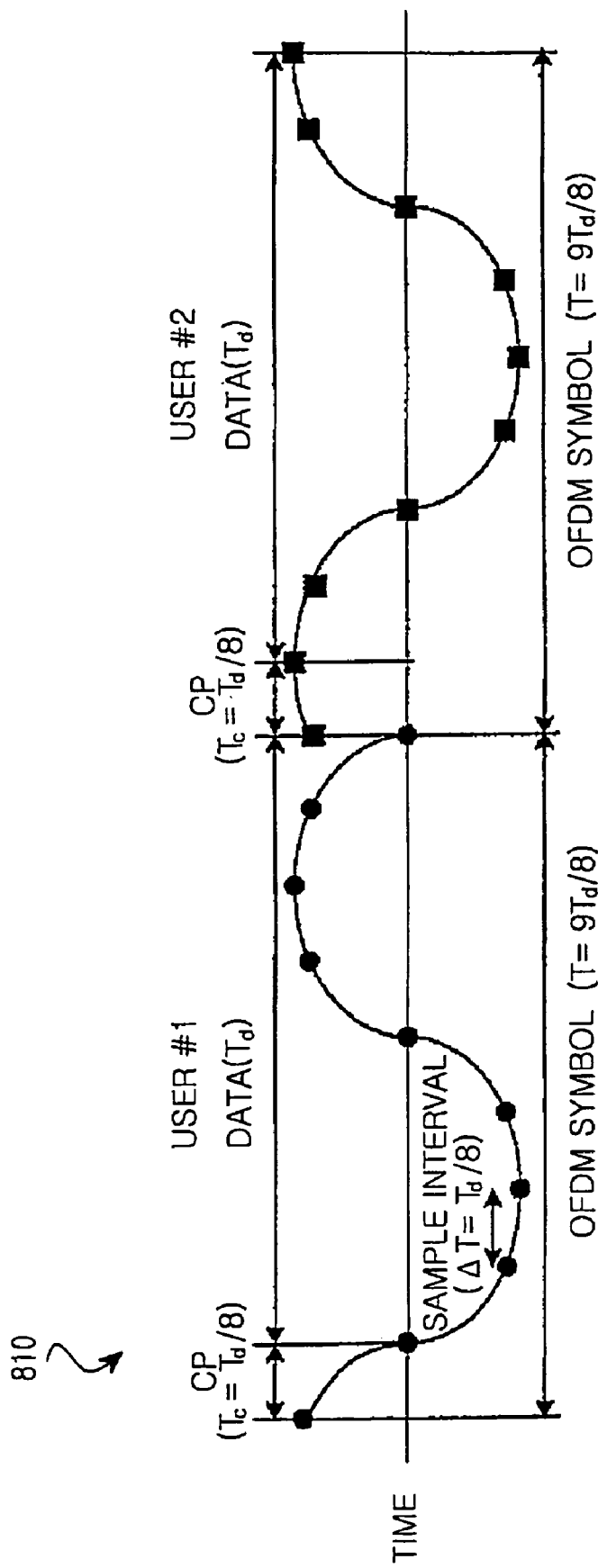
FIGS. 8A and 8B illustrate a method of canceling uplink ISI in the OFDM communication system according to an embodiment of the present invention.
Figure 8B:
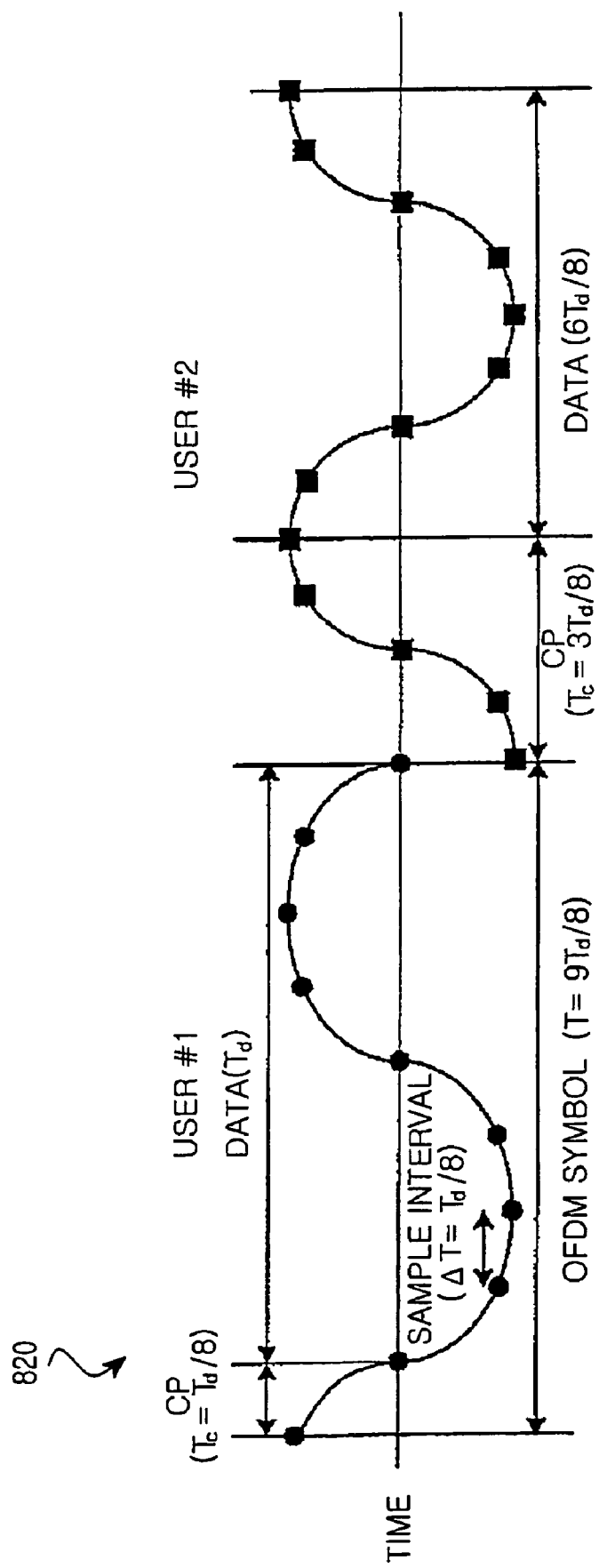

FIGS. 8A and 8B illustrate a method of canceling uplink ISI in the OFDM communication system according to an embodiment of the present invention. Similarly to the downlink ISI cancellation, the CP length is increased by adjusting the sampling rate, while the total OFDM symbol length is kept unchanged. The uplink ISI cancellation is different from the downlink ISI cancellation in that not the BS but the SS affected by ISI adjusts the CP length.

Referring to FIGS. 8A and 8B, for OFDM symbols 810, $N_{FFT}=8$, the time duration of data in the OFDM symbol after IFFT is $T_d$, and $T_c=T_d/8$. Thus, G=1/8. The first and second OFDM symbols are transmitted from user #1 and user #2, respectively. When bad multipath characteristics of user #1 bring about ISI, the CP length of the OFDM symbol from user #2 is increased as shown in an OFDM symbol 820 from user #2.

Regarding the OFDM symbol 820 from user #2, ΔT is decreased from $T_d/8$ to $3T_d/32$. As a result, the CP length is increased by a factor of 3 and all eight time-domain samples can be transmitted in a data interval of $6T_d/8$. The OFDM symbol 820 suffers from no synchronization problems because the total OFDM symbol length is kept unchanged with only the CP length changed.

Figure 9:
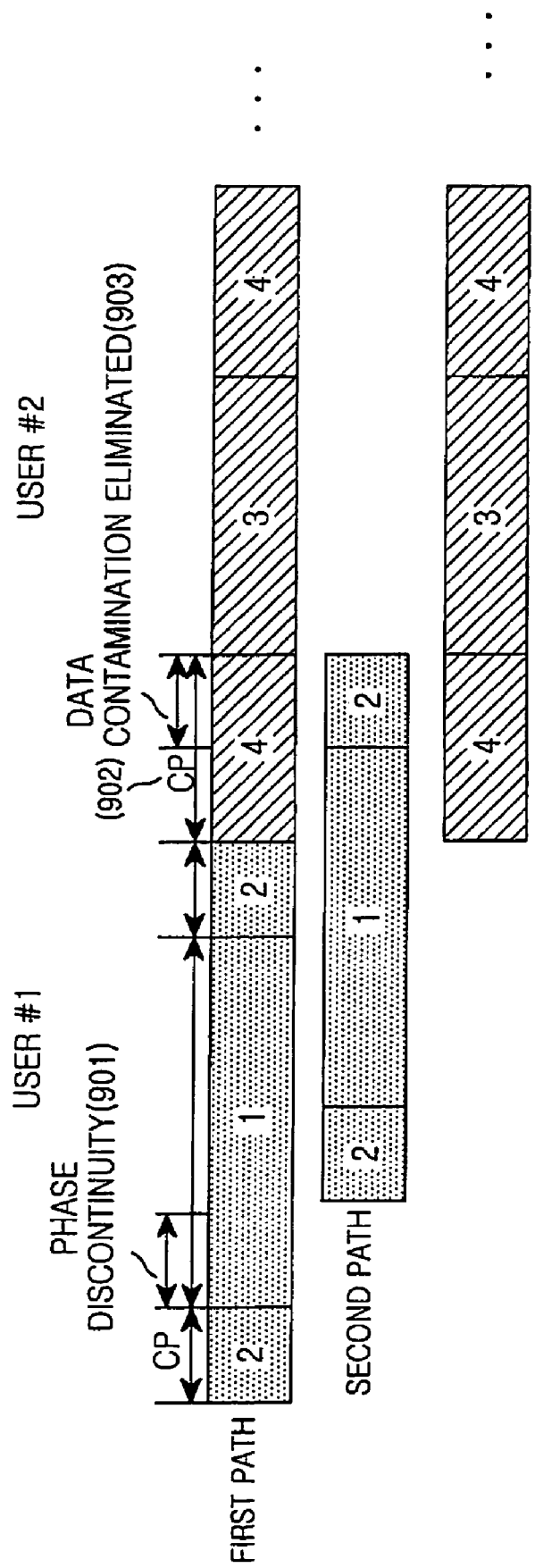
FIG. 9 illustrates the principle of uplink ISI cancellation by the method illustrated in FIGS. 8A and 8B in the OFDM communication system according to the present invention.

FIG. 9 illustrates the principle of uplink ISI cancellation by the method illustrated in FIGS. 8A and 8B in the OFDM communication system according to the embodiment of the present invention.

Figure 5:
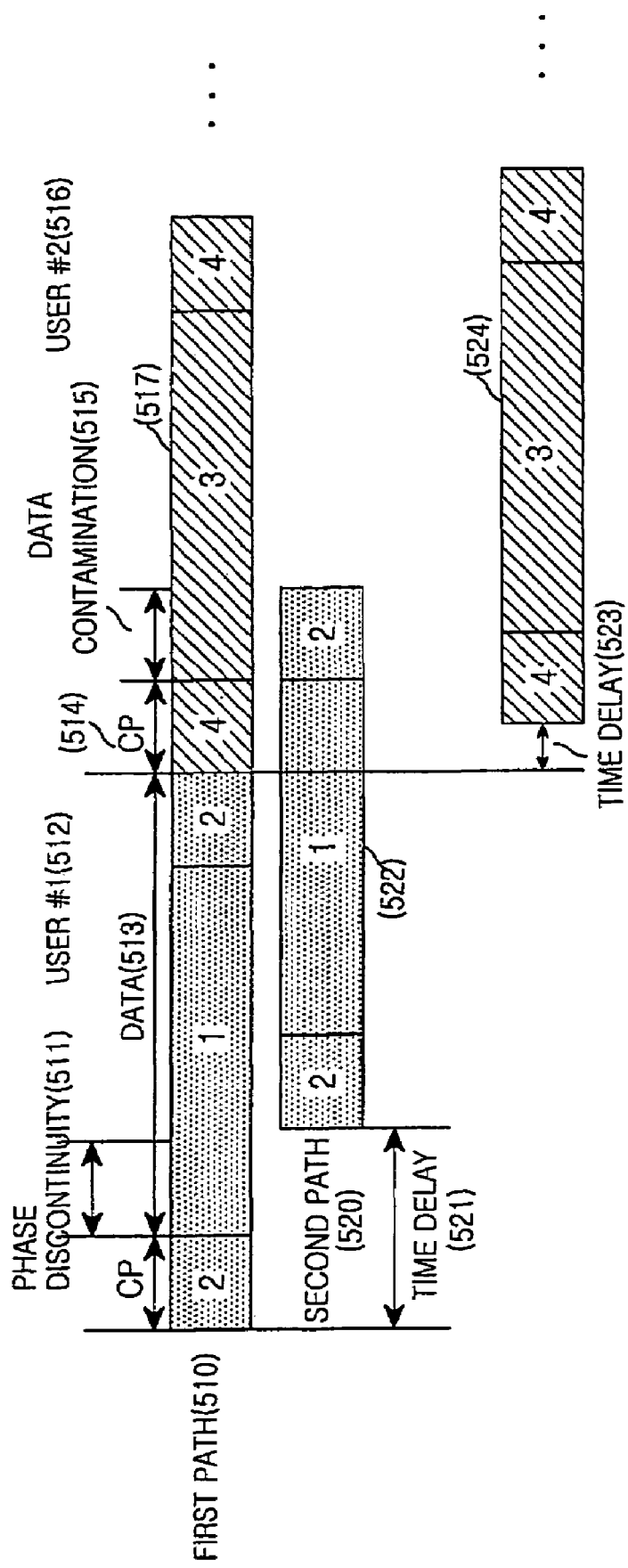
FIG. 5 illustrates multipath delay-caused data contamination of an uplink OFDM symbol in the typical OFDM communication system.

Referring to FIG. 9, typically, timing synchronization is acquired between a BS and the SSs for propagation of successive OFDM symbols in a first path on the uplink. However, the successive transmission of OFDM symbols is not ensured for a second path. As described before with reference to FIG. 5, when a multipath delay exceeds a CP length, an OFDM symbol from user #1 experiences phase discontinuity 901 and an OFDM symbol from user #2 suffers from data contamination. The data contamination is overcome by increasing the CP length of the OFDM symbol from user #2 and reducing the data interval so that a delay spread 903 is equal to or less than a CP length 902.

The above sampling rate-based CP length adjustment is simple but cannot prevent data errors caused by the phase discontinuity 901 of the OFDM symbol from user #1. Also, if the CP of user #2 is adjusted in view of the radio channel characteristics of user #1, a fairness problem may occur between them. How the phase discontinuity can be effectively eliminated will be described below.

Figure 10:
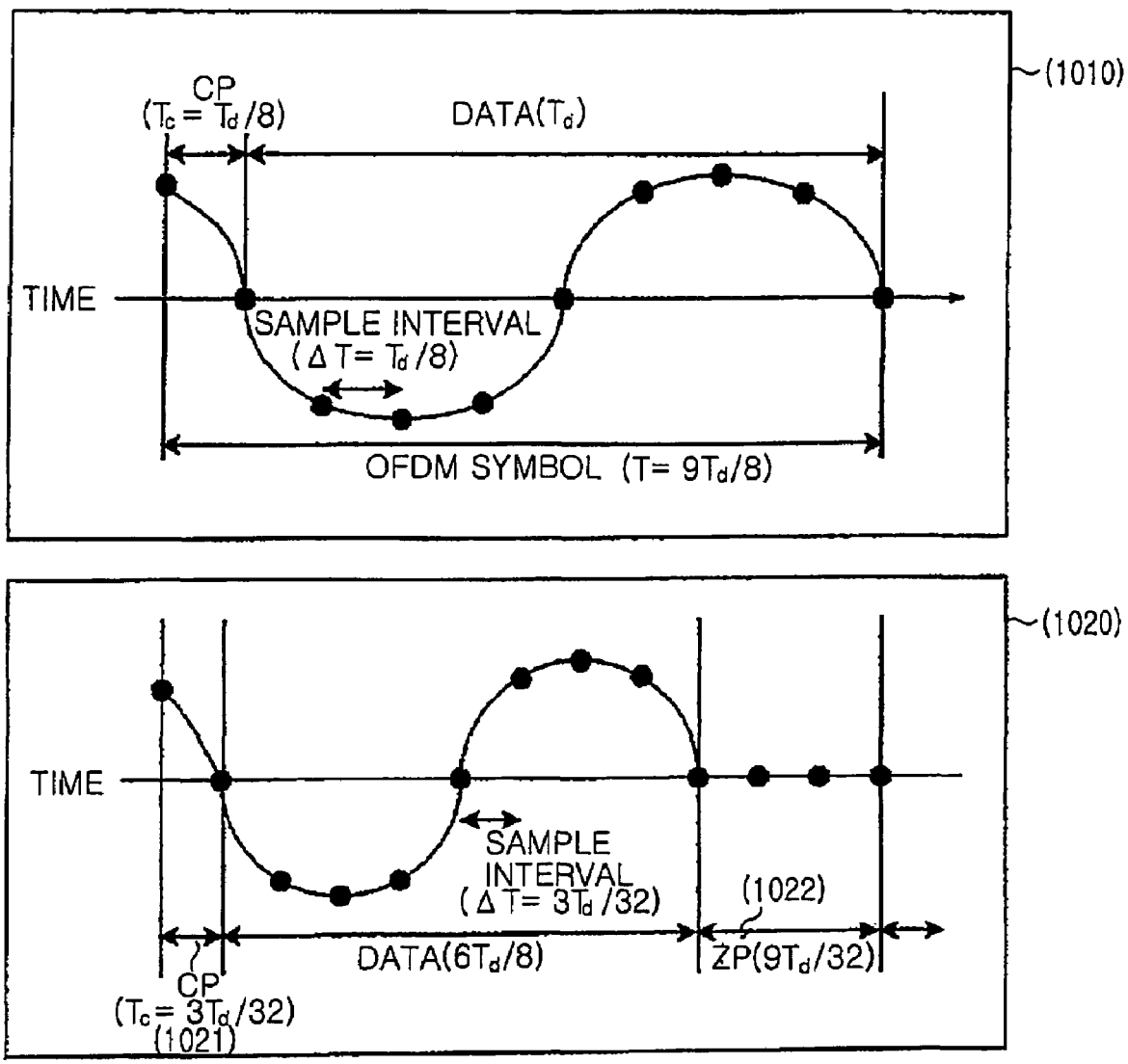
FIG. 10 illustrates a method of canceling uplink ISI in the OFDM communication system according to another embodiment of the present invention.

FIG. 10 illustrates a method of canceling uplink ISI in the OFDM communication system according to another embodiment of the present invention.

Referring to FIG. 10, for an OFDM symbol 1010, $N_{FFT}=8$, an OFDM symbol length is T, the time duration of data in the OFDM symbol after IFFT is $T_d$, and $T_c=T_d/8$. Thus, G=1/8. For ISI cancellation, the configuration of the OFDM symbol 1010 is changed to that of an OFDM symbol 1020 as follows.

The OFDM symbol 1020 is so configured that a CP length 1021 is one sample interval long similar to that of the OFDM symbol 1010 but slightly shorter due to a decrease in the sample interval, and zeroes are inserted in a last part of the OFDM symbol 1020. Once a delay spread is measured, the length $T_{ZP}$ of a ZP with all zeroes is determined. Then the time-domain sample interval ΔT' is computed by Equation (3):

$$\Delta T' = \frac{T - T_c' - T_{ZP}}{N_{FFT}} \quad (3)$$

where $T_c'$ denotes the CP length of the OFDM symbol 1020. $T_c'$ is selected so that $T_c' \approx T_c$ in the embodiment of the present invention. The sampling rate is changed, with the original CP length unchanged, and the resulting extra samples are used for a ZP. Let the resulting shortened sample interval and data interval be denoted by ΔT' and $T_d'$, respectively. Then the number $N_{ZP}$ of ZP samples in the last part of the data interval is shown in Equation (4):

$$N_{ZP} = \frac{T - T_d' - T_c'}{\Delta T'} \quad (4)$$

For the OFDM symbol 1020, $N_{FFT}=8$ and the ZP length is about twice the CP length of the original OFDM symbol 1010. The sample interval is $3T_d/32$, the resulting ZP length is $9T_d/32$, the CP length of the OFDM symbol after IFFT is $3T_d/32$, and the data interval is $6T_d/8$. Therefore, the OFDM symbol 1020 is as long as the original OFDM symbol 1010.

Figure 11:
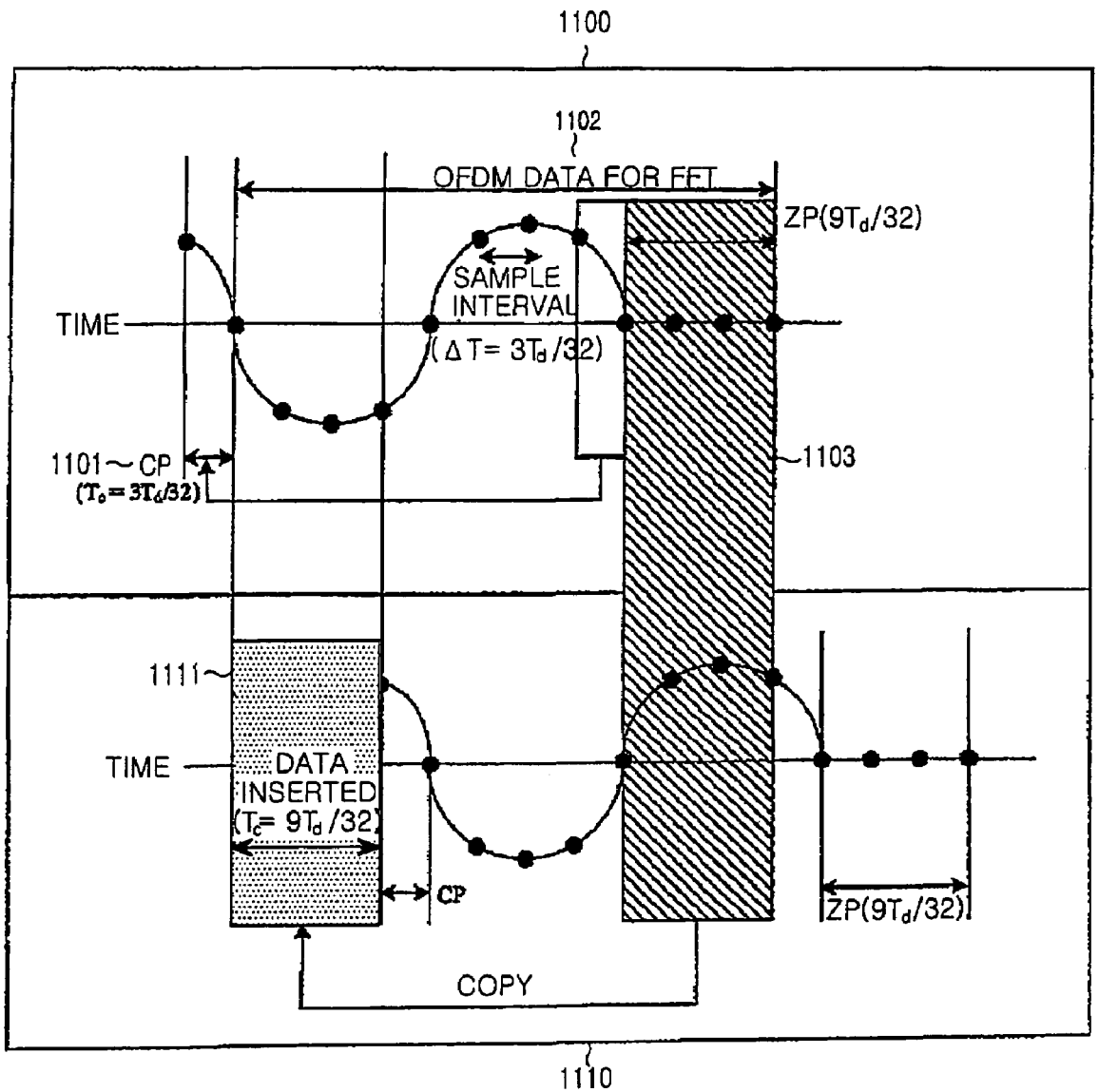
FIG. 11 illustrates a method of receiving a ZP-inserted symbol in the OFDM communication system according to the present invention.

FIG. 11 illustrates a method of receiving a ZP-inserted symbol in the OFDM communication system according to the present invention.

In general, an uplink OFDM symbol arrives at an uplink receiver from different paths. OFDM symbols 1100 and 1110 from two major paths that most significantly affect data recovery are illustrated. The two OFDM symbols 1100 and 1110 are received in combination at the uplink receiver. The receiver, which can not separate the two paths from each other, extracts a CP 1101 and discards it, for data recovery. The receiver then FFT-processes time-domain data samples within an FFT window 1102. Phase discontinuity 1111 of the OFDM symbol 1110 in the second path causes a decrease in data reception gain. For the purpose of preventing the decrease of data reception gain, a copy of the data samples of a ZP 1103 is inserted after a CP 1101 and then FFT-processed. Thus, the phase discontinuity 1111 caused by the delay of the OFDM symbol 1110 in the second path is eliminated.

Figure 12:
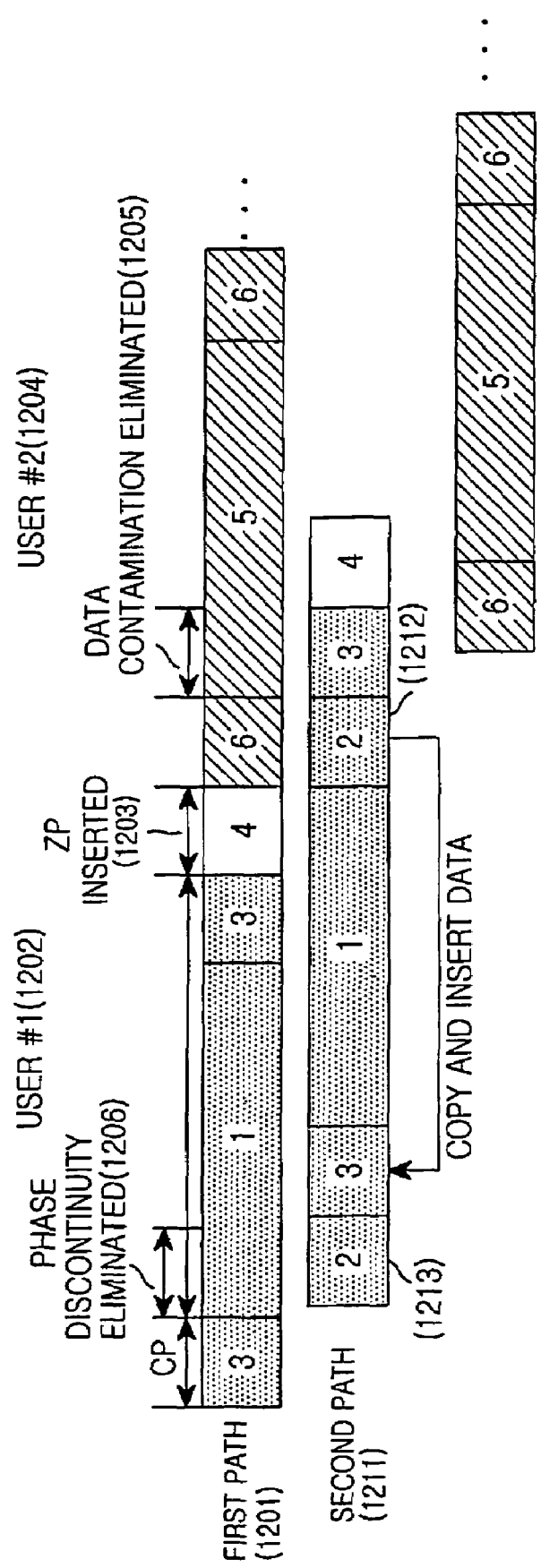
FIG. 12 illustrates the principle of uplink ISI cancellation by the method illustrated in FIG. 10 in the OFDM communication system according to the present invention.

FIG. 12 illustrates the principle of uplink ISI cancellation by the method illustrated in FIG. 10 in the OFDM communication system according to the present invention.

Referring to FIG. 12, an OFDM symbol from a user 1202 (user #1) in a first path 1201 has the configuration illustrated in FIG. 10. That is, the OFDM symbol 1201 has a ZP 1203 inserted in extra data samples made available by changing a sampling rate, in addition to a CP and data.

In this case, an OFDM symbol from user #1 in a second path 1211 does not contaminate an OFDM symbol from a user 1204 (user #2) in the first path 1201 because the ZP 1203 of the OFDM symbol from user #1 overlaps with data of the OFDM symbol from user #2. In data recovery, a copy of the ZP 1203 of the OFDM symbol from user #1 in the first path 1201 is inserted after the CP of the first path 1201, that is, data 2 in the data interval of the OFDM symbol from user #1 in the second path 1211 is inserted before the CP of the second path 1211. The resulting elimination of phase discontinuity 1206 prevents performance degradation in data recovery for user #1.

Figure 13:
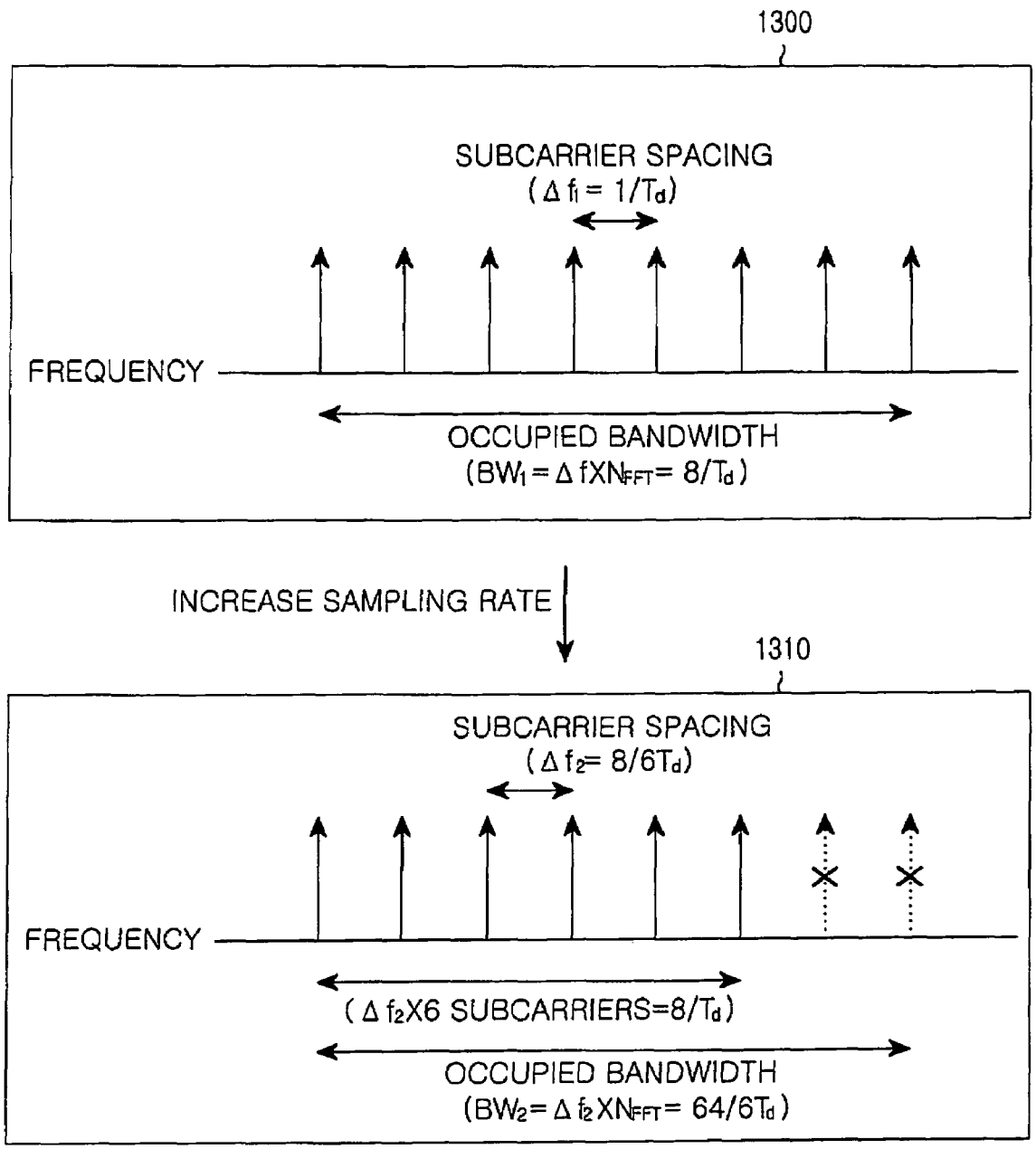
FIG. 13 illustrates a frequency-domain change in an OFDM symbol when the sampling rate of the OFDM symbol is changed according to the present invention.

FIG. 13 illustrates a frequency-domain change in an OFDM symbol when the sampling rate of the OFDM symbol is changed according to the present invention.

Referring to FIG. 13, reference numeral 1300 denotes a frequency-domain representation of the typical time-domain OFDM symbol 610 illustrated in FIG. 6. Typically, a basic subcarrier spacing in the frequency domain is the reciprocal of the data interval of the time-domain OFDM symbol, and an occupied bandwidth is the product of the basic subcarrier spacing and an FFT size. For $T_d$ representing a data interval and an FFT size of 8, the subcarrier spacing in the frequency domain is $\Delta f_1 = 1/T_d$, and the occupied bandwidth is $BW_1 = \Delta f_1 \times N_{FFT} = 8/T_d$. Thus, since a frequency-domain signal distribution is closely related to a time-domain signal distribution, the change of a parameter in time brings about an associated change in the frequency.

Reference numeral 1310 denotes a frequency-domain change arising from the change of the sampling rate to increase a CP length or insert a ZP. For example, if the sample interval is changed from $T_d/8$ to $3T_d/32$, the basic subcarrier spacing becomes $\Delta f_2 = 8/6T_d$, the reciprocal of the data interval $6/8T_d$ of the time-domain OFDM symbol and the occupied bandwidth becomes $BW_2 = \Delta f_2 \times N_{FFT} = 64/6T_d$. Although the same amount of resources are used due to the same OFDM symbol length, the decrease of the sampling rate increases the frequency bandwidth of each subcarrier. That is, each subcarrier occupies more frequency resources. The adjustment of a CP length or the insertion of a ZP in the time domain according to the present invention does not change the time-domain resources used. In the frequency domain, however, due to the resulting increase in the occupied bandwidth, there is no gain in data capacity, and band filters need to be replaced. These problems can be solved in the following way.

As described before in connection with Equation (1), the OFDM system maps actual transmission data onto the subcarriers. The frequency-domain OFDM symbol 1300 occupies a frequency bandwidth of $8/T_d$ and carries eight data signals on eight subcarriers. In comparison, the frequency-domain OFDM symbol 1310 carries only six data signals on six subcarriers which exist in the occupied bandwidth of $8/T_d$. Therefore, the increase of a CP length or the insertion of a ZP reduces the amount of transmittable data. Yet, an effect equivalent to that of the transmission of eight data signals can be achieved by puncturing two out of the eight data signals and transmitting the remaining six data signals. This method will be described below.

Figure 2:
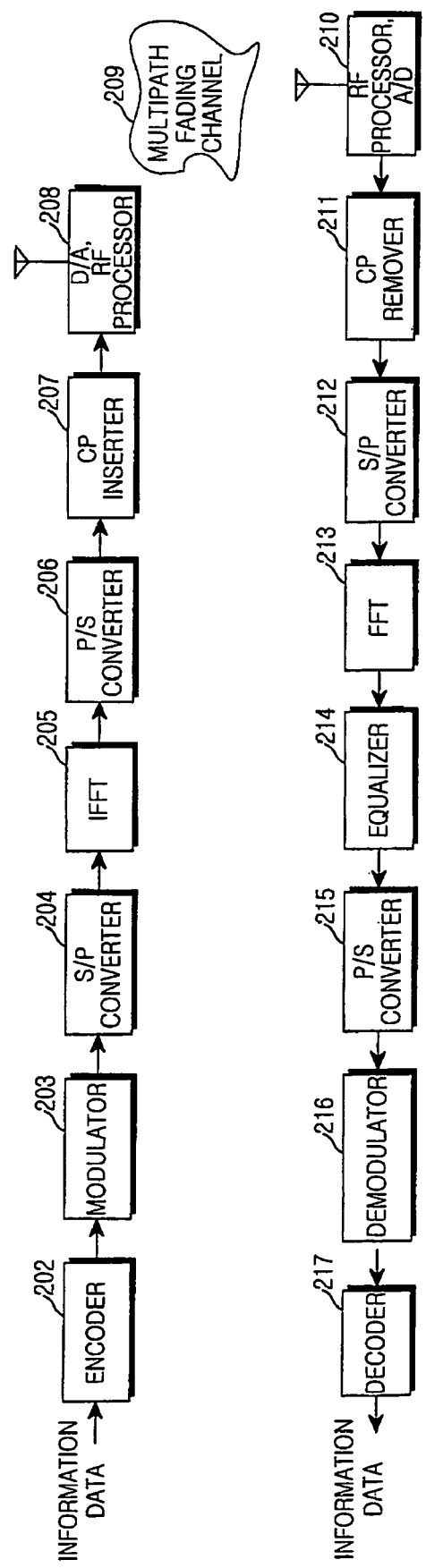
FIG. 2 is a block diagram of a transmitter and a receiver in a typical OFDM wireless communication system.
Figure 3:
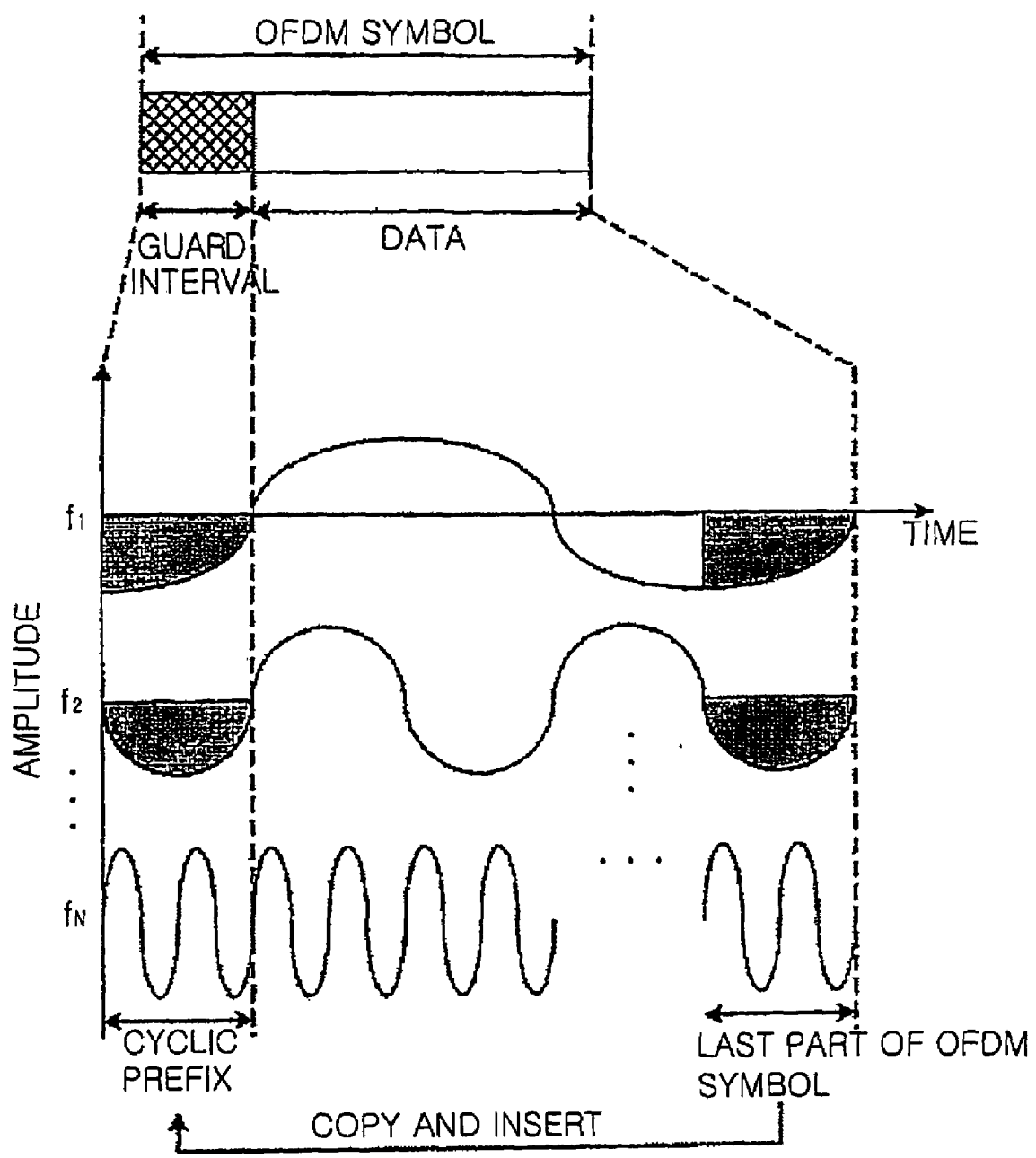
FIG. 3 illustrates a typical OFDM symbol in a time-frequency domain.

In the transmitter illustrated in FIG. 2, the IFFT processor 205 maps data to the subcarriers and the encoder 202 resides before the IFFT processor 205. In general, the encoder 202 encodes data at a coding rate expressed as a fraction. Given a coding rate of 1/2, the original four transmission data is doubled to eight coded data. While the transmission of six out of the eight data decreases reception performance compared to transmission of all the eight data, aside from performance degradation caused by the decrease of the coding rate from 1/2 to 2/3, no deadly data recovery errors are produced from multipath delay-caused ISI.

To summarize the above method, let the subcarrier spacing and occupied bandwidth of an original OFDM symbol with no change in a CP or a ZP be denoted by $\Delta f_1$ and $BW_1$, respectively, and let the subcarrier spacing and occupied bandwidth of an OFDM symbol with a sampling rate changed be denoted by $\Delta f_2$ and $BW_2$, respectively. Then the number $N'_{FFT}$ of valid subcarriers carried within an actual limited bandwidth is shown in Equation (5):

$$N'_{FFT} = \text{floor}\left(\frac{BW_1}{\Delta f_2}\right) \quad (5)$$

where floor ( ) is a floor function of returning the largest integer not greater than the value within ( ) as a floating-point value. While increasing a CP length or inserting a ZP in turn changes the subcarrier spacing and as a result, the number of data transmittable within an actually available limited bandwidth is reduced, this problem is solved by puncturing code symbols taking into account the number of valid subcarriers used for the original coded data, prior to transmission.

Figure 14:
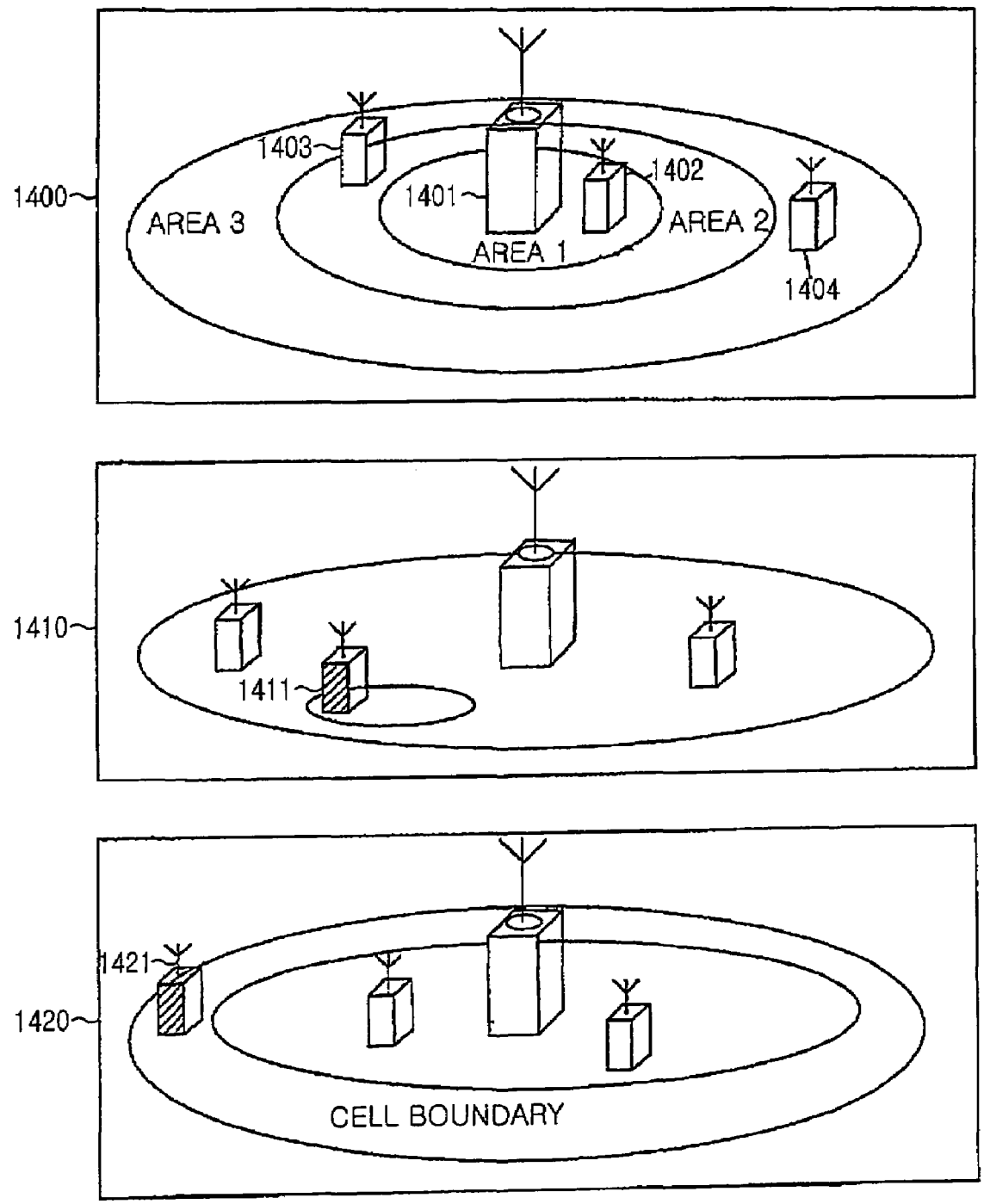
FIG. 14 illustrates exemplary actual applications of CP adjustment and ZP insertion to a system according to the present invention.

FIG. 14 illustrates exemplary actual applications of CP adjustment and ZP insertion to a system according to the present invention.

Regarding an application example 1400, a BS 1401 and three SSs 1402, 1403 and 1404 exist in different areas, and the delay spread is different in each area depending on the distance between the BS and the SSs. Area 1 nearest to the BS 1401 has the shortest delay spread, whereas area 3 remotest from the BS 1401 has the longest delay spread. As an exemplary application, the cell radius of a BS is divided into a plurality of areas and different CP and ZP lengths are set for each area, to thereby maximize the total data capacity of the cell. Specifically, shorter CP and ZP lengths are allocated to an area nearer to the BS to deliver more data for an OFDM symbol length. On the other hand, longer CP and ZP lengths are allocated to an area farther from the BS to ensure data reliability rather than to deliver much data.

Regarding another application example 1410, the multipath delay spread increases with the distance between the BS and the SS, it can increase irrespective of the distance under a certain environment. Thus, an OFDM symbol is reconfigured by changing a CP and a ZP according to a delay spread measured at an SS 1411, irrespective of the distance between the BS and the SS 1411. Therefore, the OFDM symbol configuration is determined according to only the delay spread specific to the SS and the data performance degradation caused by ISI is effectively overcome.

In a third application example 1420, the delay spread increases in the vicinity of a cell boundary where a handover to another cell occurs as it increases with the distance between the BS and the SS. Hence, the original OFDM symbol configuration is used in the other areas within the cell, while the OFDM symbol is reconfigured for SSs at the cell boundary or in the handover zone by changing a CP and a ZP according to their delay spreads.

The first and third applications use different OFDM symbol configurations according to the distances between the BS and the SSs without measuring the delay spreads. Alternatively, through the delay spreads are measured, they are considered only when needed. The second application use different OFDM symbol configurations according to the delay spreads irrespective of the distances. While the first application focuses on increasing data capacity in a cell, whereas the second and third applications aim to prevent data errors in the SSs.

Figure 15:
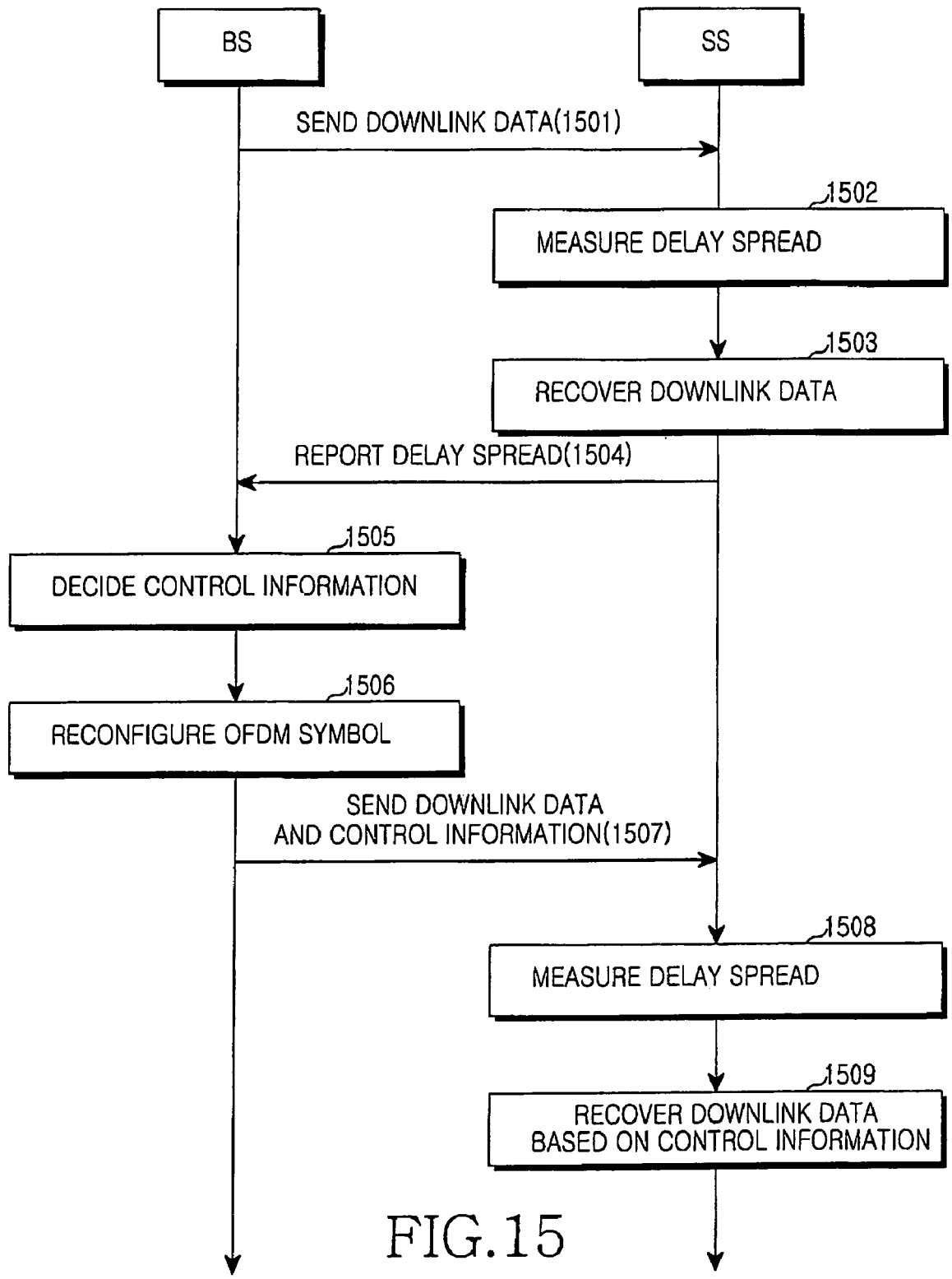
FIG. 15 is a flowchart illustrating a downlink data communication operation in the OFDM communication system according to an embodiment of the present invention.

FIG. 15 is a flowchart illustrating a downlink data communication operation in the OFDM communication system according to an embodiment of the present invention.

Referring to FIG. 15, a BS transmits downlink data to an SS in step 1501. The SS measures the delay spread of the downlink data based on the reciprocal nature of a physical channel between the BS and the SS in step 1502. The SS then recovers the downlink data in step 1503 and reports the delay spread measurement to the BS in step 1504.

In step 1505, the BS determines control information for generating an OFDM symbol based on the downlink delay spread. For example, if the delay spread is longer than a current CP length, the CP length is increased for the OFDM symbol, and control information containing a CP length, a sampling rate, and a puncturing pattern is determined according to the increased CP length.

The BS reconfigures the OFDM symbol according to the control information and generates downlink data according to the OFDM symbol reconfiguration in step 1506, and transmits the control information and the downlink data to the SS in step 1507.

In step 1508, the SS receives the downlink data at the sampling rate set in the control information and measures the delay spread of the downlink data based on the reciprocal nature of the physical channel represented in the downlink data. The SS recovers the downlink data using the CP length and the puncturing pattern set in the control information in step 1509. Because this downlink data has a CP of a changed length according to the delay spread, a data reception gain is increased compared to that in step 1503.

FIGS. 16 to 19 describe procedures for increasing a data reception gain on the uplink.

Figure 16:
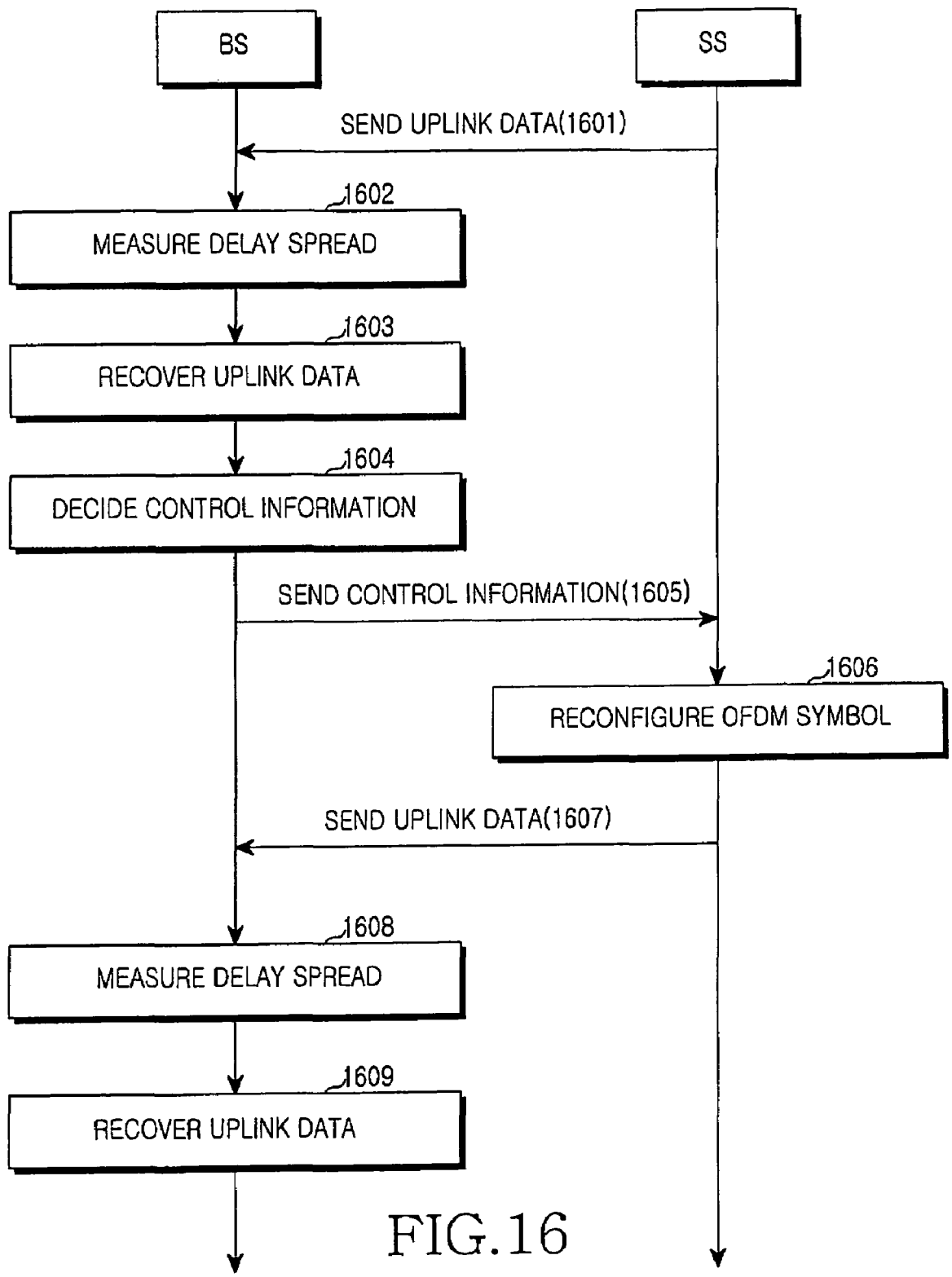
FIG. 16 is a flowchart illustrating an uplink data communication operation in the OFDM communication system according to an embodiment of the present invention.

FIG. 16 is a flowchart illustrating an uplink data communication operation in the OFDM communication system according to an embodiment of the present invention.

Referring to FIG. 16, the SS transmits uplink data to the BS in step 1601. The BS measures the delay spread of the uplink data based on the reciprocal nature of a physical channel between the BS and the SS in step 1602.

The BS then recovers the uplink data in step 1603 and determines control information for generating an OFDM symbol based on the uplink delay spread in step 1604. For example, if the delay spread is longer than a current CP length, the CP length is increased for the OFDM symbol, and control information containing a CP length, a sampling rate, and a puncturing pattern is determined according to the increased CP length. In step 1605, the BS transmits the control information to the SS.

The SS reconfigures the OFDM symbol according to the control information and generates uplink data according to the OFDM symbol reconfiguration in step 1606, and transmits the uplink data to the BS in step 1607.

In step 1608, the BS receives the uplink data at the determined sampling rate and measures the delay spread of the uplink data based on the reciprocal nature of the physical channel represented in the uplink data. The BS recovers the uplink data using the determined CP length and puncturing pattern in step 1609. Because this uplink data has a CP of the changed length according to the delay spread, a data reception gain is increased compared to that in step 1603.

Figure 17:
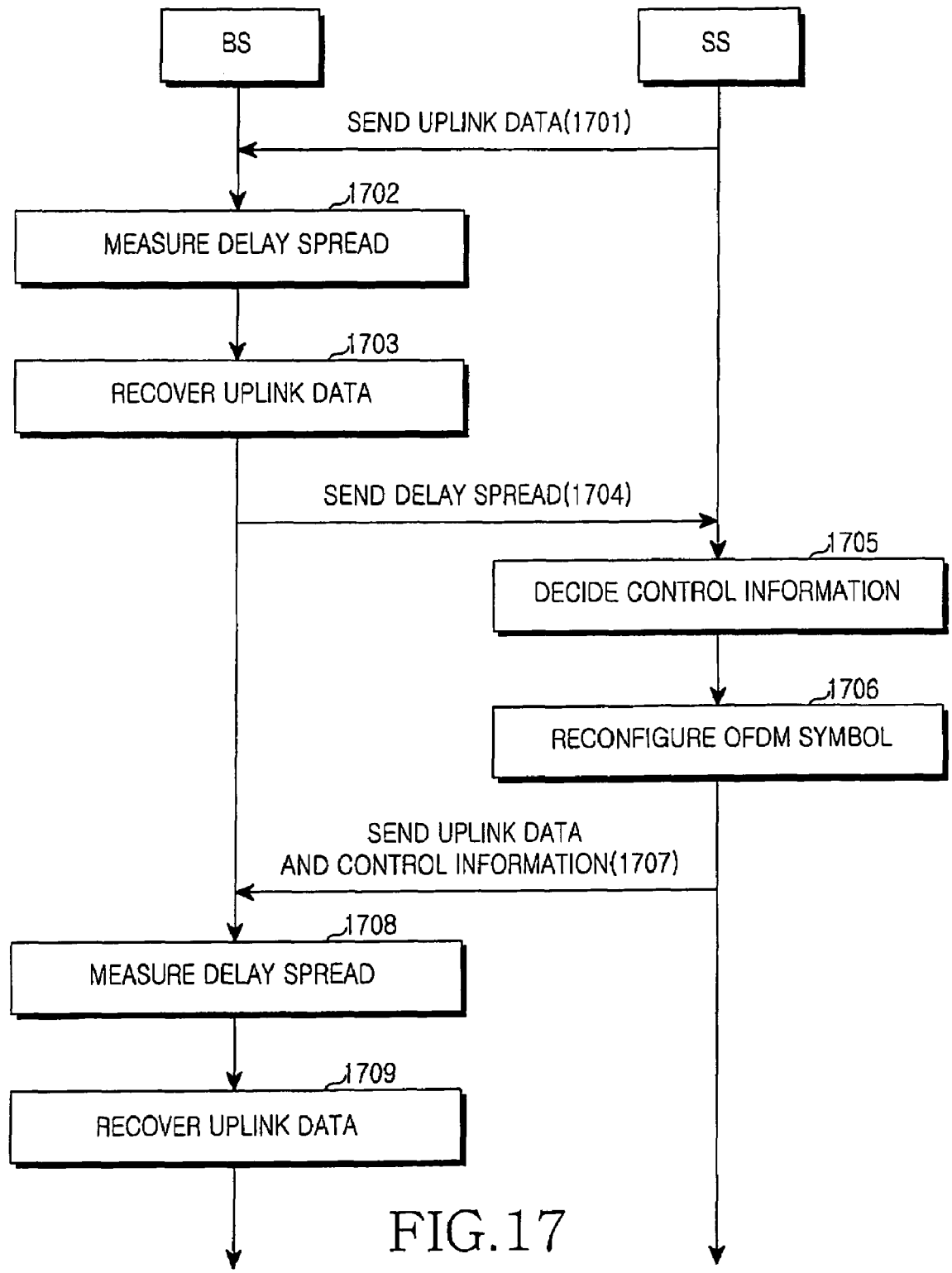
FIG. 17 is a flowchart illustrating an uplink data communication operation in the OFDM communication system according to an embodiment of the present invention.

FIG. 17 is a flowchart illustrating an uplink data communication operation in the OFDM communication system according to an embodiment of the present invention.

Referring to FIG. 17, the SS transmits uplink data to the BS in step 1701. The BS measures the delay spread of the uplink data based on the reciprocal nature of the physical channel between the BS and the SS in step 1702. The BS then recovers the uplink data in step 1703 and transmits the delay spread measurement to the SS in step 1704.

The SS determines control information for generating an OFDM symbol based on the uplink delay spread in step 1705. For example, if the delay spread is longer than a current CP length, the CP length is increased for the OFDM symbol, and control information containing a CP length, a sampling rate, and a puncturing pattern is determined according to the increased CP length.

In step 1706, the SS reconfigures the OFDM symbol according to the control information and generates uplink data according to the OFDM symbol reconfiguration. The SS transmits the uplink data and the control information to the BS in step 1707.

In step 1708, the BS receives the uplink data at the sampling rate set in the control information and measures the delay spread of the uplink data based on the reciprocal nature of the physical channel represented in the uplink data. The BS recovers the uplink data using the CP length and puncturing pattern set in the control information in step 1709. Because this uplink data has a CP of the changed length according to the delay spread, a data reception gain is increased compared to that in step 1703.

Figure 18:
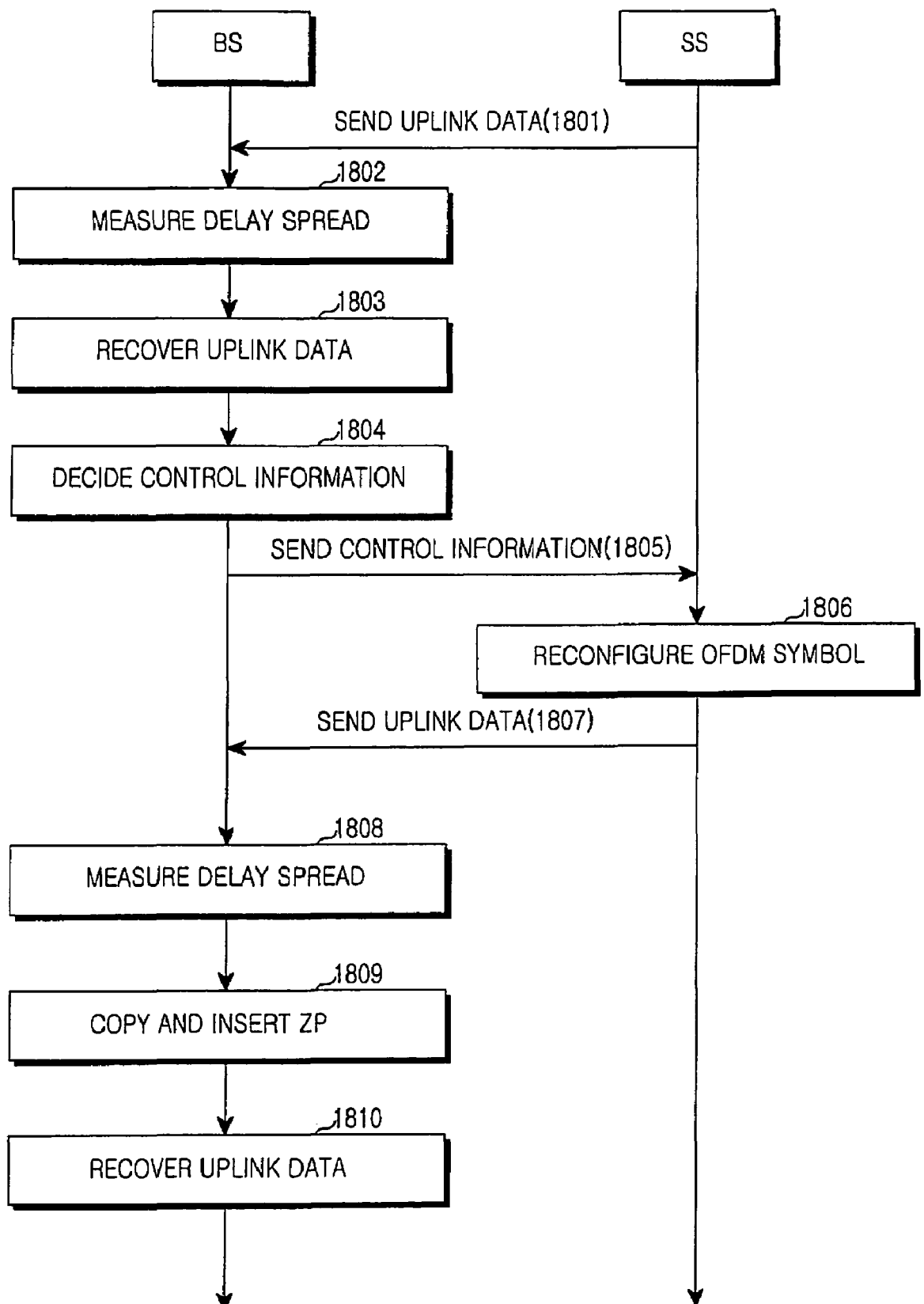
FIG. 18 is a flowchart illustrating an uplink data communication operation in the OFDM communication system according to an embodiment of the present invention.

FIG. 18 is a flowchart illustrating an uplink data communication operation in the OFDM communication system according to an embodiment of the present invention.

Referring to FIG. 18, the SS transmits uplink data to the BS in step 1801. The BS measures the delay spread of the uplink data based on the reciprocal nature of the physical channel between the BS and the SS in step 1802.

The BS then recovers the uplink data in step 1803 and determines control information for generating an OFDM symbol based on the uplink delay spread in step 1804. For example, if the delay spread is longer than a current CP length, the length of a ZP to be inserted in the last part of the OFDM symbol is determined and control information containing a ZP length, a sampling rate, and a data puncturing pattern is determined in correspondence with the ZP insertion. In step 1805, the BS transmits the control information to the SS.

The SS reconfigures the OFDM symbol according to the control information and generates uplink data according to the OFDM symbol reconfiguration in step 1806, and transmits the uplink data to the BS in step 1807.

In step 1808, the BS receives the uplink data at the determined sampling rate and measures the delay spread of the uplink data based on the reciprocal nature of the physical channel represented in the uplink data. The BS inserts a copy of the ZP of each OFDM symbol in the uplink data to the CP of the OFDM symbol according to the determined ZP length in step 1809 and recovers the OFDM symbols with the copies of ZPs inserted after the CPs to the original data according to the determined puncturing pattern in step 1810.

Figure 19:
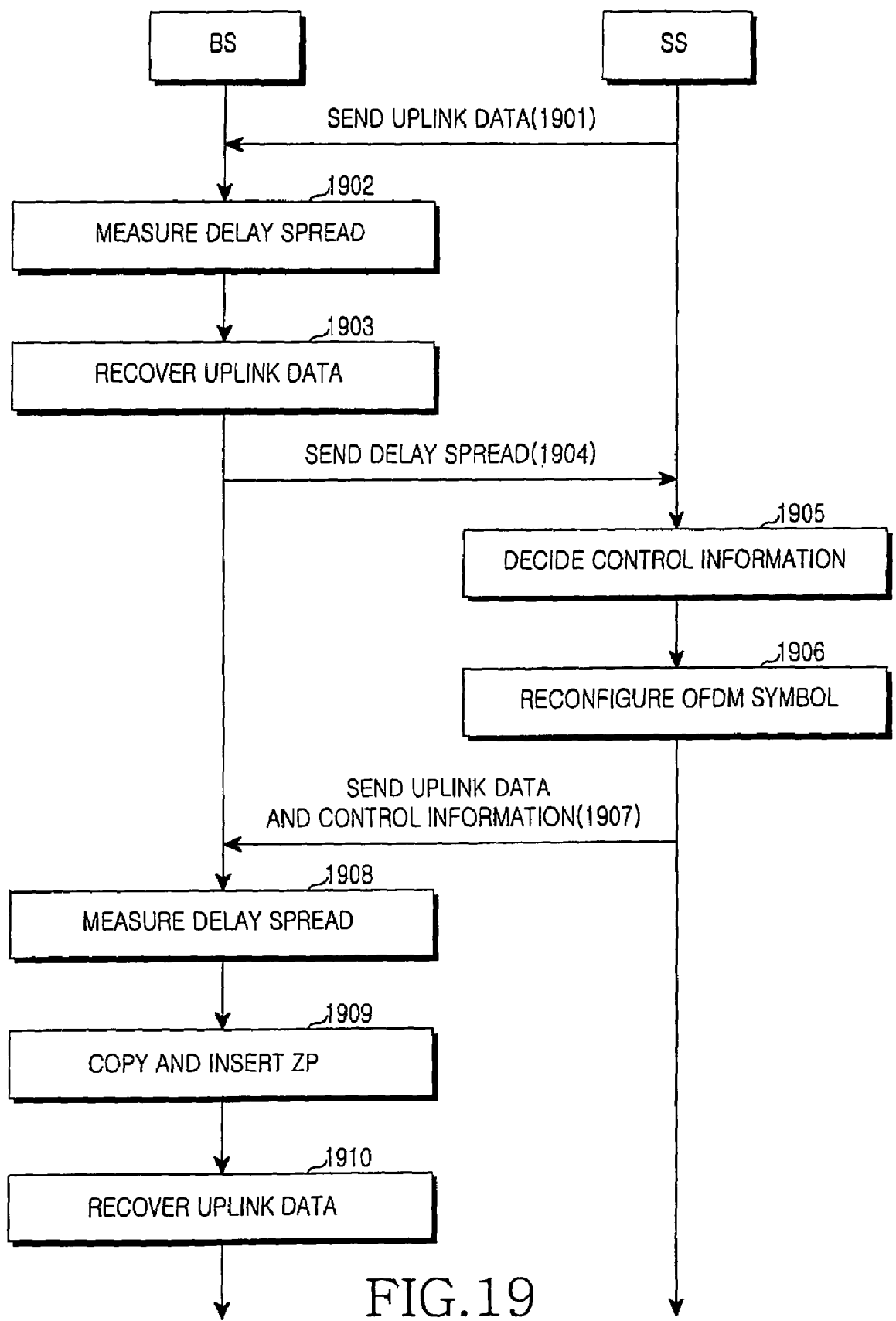
FIG. 19 is a flowchart illustrating an uplink data communication operation in the OFDM communication system according to an embodiment of the present invention.

FIG. 19 is a flowchart illustrating an uplink data communication operation in the OFDM communication system according to an embodiment of the present invention.

Referring to FIG. 19, the SS transmits uplink data to the BS in step 1901. The BS measures the delay spread of the uplink data based on the reciprocal nature of the physical channel between the BS and the SS in step 1902. The BS then recovers the uplink data in step 1903 and transmits the delay spread measurement to the SS in step 1904.

The SS determines control information for generating an OFDM symbol based on the uplink delay spread in step 1905. For example, if the delay spread is longer than a current CP length, the length of a ZP to be inserted in the last part of the OFDM symbol is determined and control information containing a ZP length, a sampling rate, and a data puncturing pattern is determined in correspondence with the ZP insertion.

In step 1906, the SS reconfigures the OFDM symbol according to the control information and generates uplink data according to the OFDM symbol reconfiguration. The SS transmits the uplink data and the control information to the BS in step 1907.

In step 1908, the BS receives the uplink data at the determined sampling rate and measures the delay spread of the uplink data based on the reciprocal nature of the physical channel represented in the uplink data. The BS inserts a copy of the ZP of each received OFDM symbol to the CP of the OFDM symbol according to the ZP length set in the control information in step 1909 and recovers the OFDM symbols with the copies of ZPs inserted after the CPs to the original data according to the puncturing pattern set in the control information in step 1910.

Figure 20:
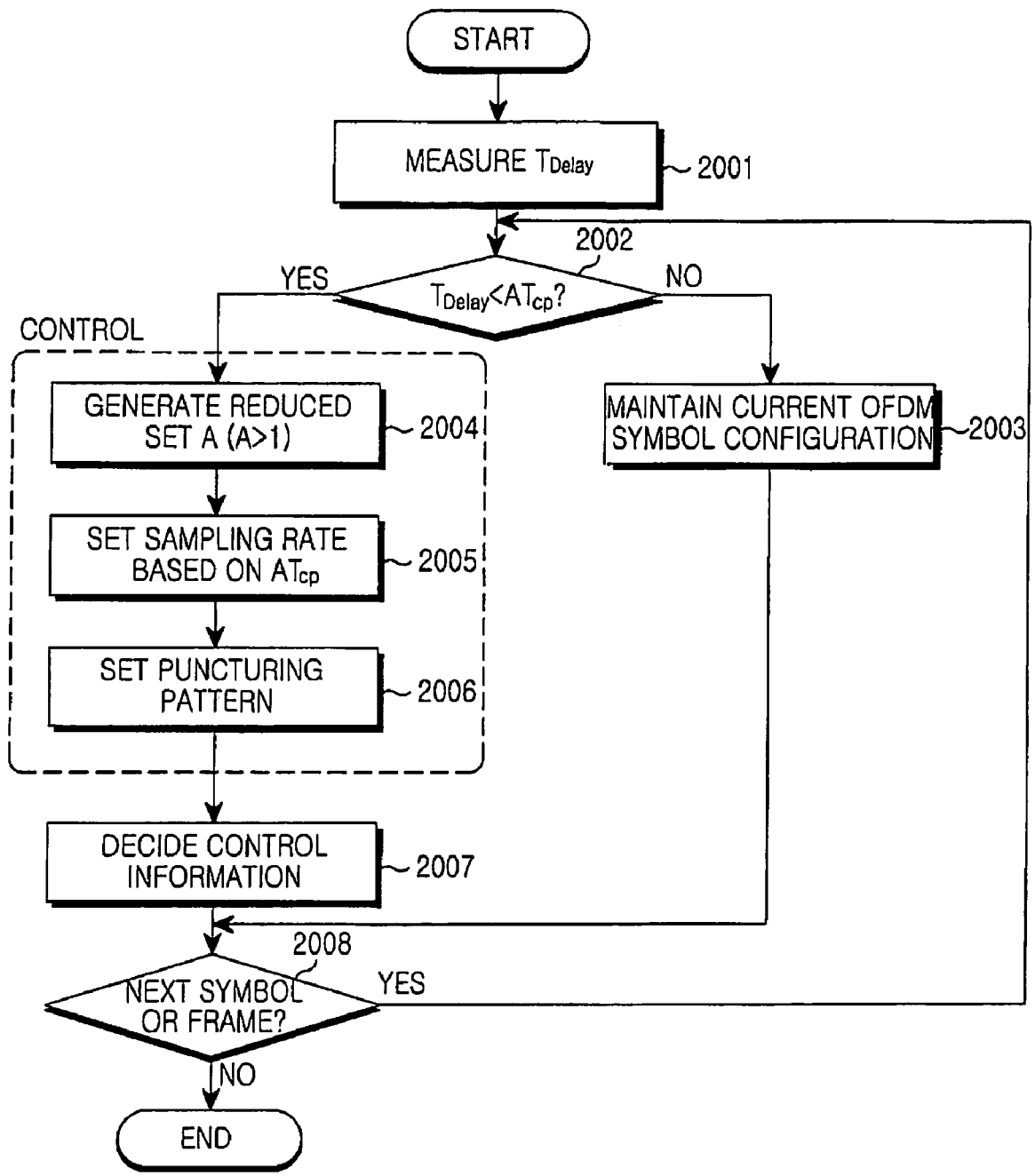
FIG. 20 is a flowchart illustrating an operation for adjusting a CP length according to a delay spread in the OFDM communication system according to an embodiment of the present invention.

FIG. 20 is a flowchart illustrating a procedure for determining control information described in FIGS. 15, 16 and 17, specifically an operation for adjusting a CP length according to a delay spread in the OFDM communication system according to an embodiment of the present invention. As described before, the transmitter or the receiver determines control information containing a CP length, a sampling rate, a puncturing pattern, etc. in accordance with a delay spread. It is assumed herein that the receiver decides the control information.

Referring to FIG. 20, the receiver measures a delay spread $T_{Delay}$ based on the reciprocal nature of the physical channel in step 2001 and compares the delay spread with a current CP length $AT_{CP}$ (A is a real number) in step 2002.

If the delay spread is shorter than the CP length, the receiver maintains a current OFDM symbol configuration in step 2003 and proceeds to step 2008. On the other hand, if the delay spread is longer than the CP length, the receiver sets the value A such that the delay spread is shorter than the CP length in step 2004, determines a sampling rate according to the changed CP length in step 2005, and determines the number of data to be punctured and a data puncturing pattern according to the sampling rate in step 2006.

The receiver sets control information with the CP length, the sampling rate, and the puncturing pattern in step 2007. In step 2008, the receiver determines if there is the next symbol or frame to be transmitted. In the presence of the next symbol or frame, the receiver returns to step 2002. In the absence of the next symbol or frame, the receiver terminates the algorithm according to the present invention. This algorithm is performed every set time period (e.g. on a frame basis) or upon request from the receiver.

Figure 21:
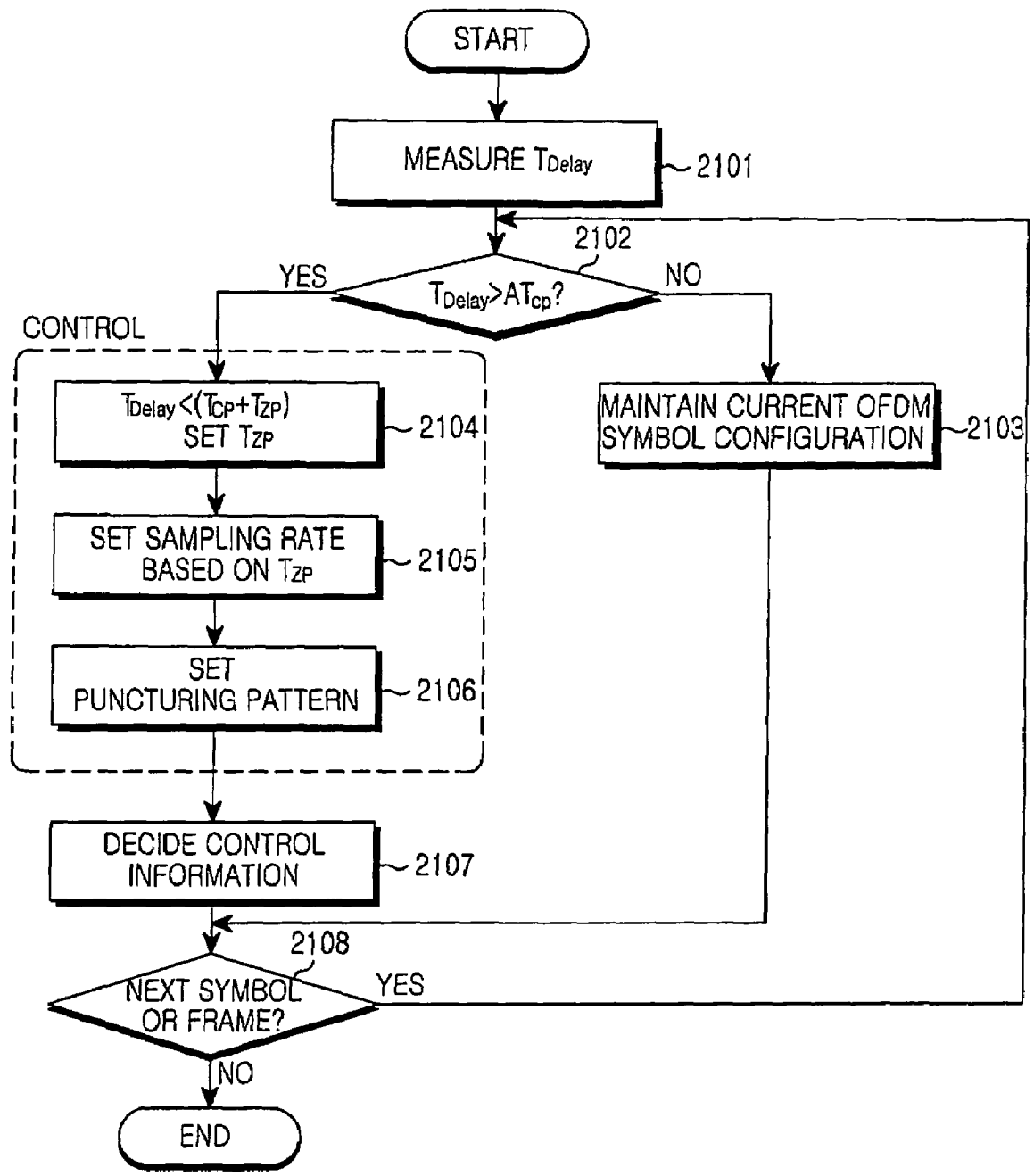
FIG. 21 is a flowchart illustrating an operation for adjusting a ZP length according to a delay spread in the OFDM communication system according to an embodiment of the present invention.

FIG. 21 is a flowchart illustrating a procedure for deciding control information described in FIGS. 18 and 19, specifically an operation for adjusting a ZP length according to a delay spread in the OFDM communication system according to an embodiment of the present invention. As described before, the transmitter or the receiver determines control information containing a ZP length, a sampling rate, a puncturing pattern, etc. in accordance with a delay spread. It is assumed herein that the receiver determines the control information.

Referring to FIG. 21, the receiver measures a delay spread $T_{Delay}$ based on the reciprocal nature of the physical channel in step 2101 and compares the delay spread with a current CP length $AT_{CP}$ (A is a real number) in step 2102.

If the delay spread is shorter than the CP length, the receiver maintains a current OFDM symbol configuration in step 2103 and proceeds to step 2108. On the other hand, if the delay spread is longer than the CP length, the receiver determines a ZP length $T_{ZP}$ such that the sum of the CP length and the ZP length is longer than the delay spread in step 2104. The ZP length refers to the time duration of a ZP inserted in the last part of the OFDM symbol. The receiver then determines a sampling rate according to the ZP length in step 2105, and determines the number of data to be punctured and a data puncturing pattern according to the sampling rate in step 2106.

The receiver sets control information with the ZP length, the sampling rate, and the puncturing pattern in step 2107. In step 2108, the receiver determines if there is the next symbol or frame to be transmitted. In the presence of the next symbol or frame, the receiver returns to step 2102. In the absence of the next symbol or frame, the receiver terminates the algorithm according to the present invention. This algorithm is performed every set time period (e.g. on a frame basis) or upon request from the receiver.

Figure 22:
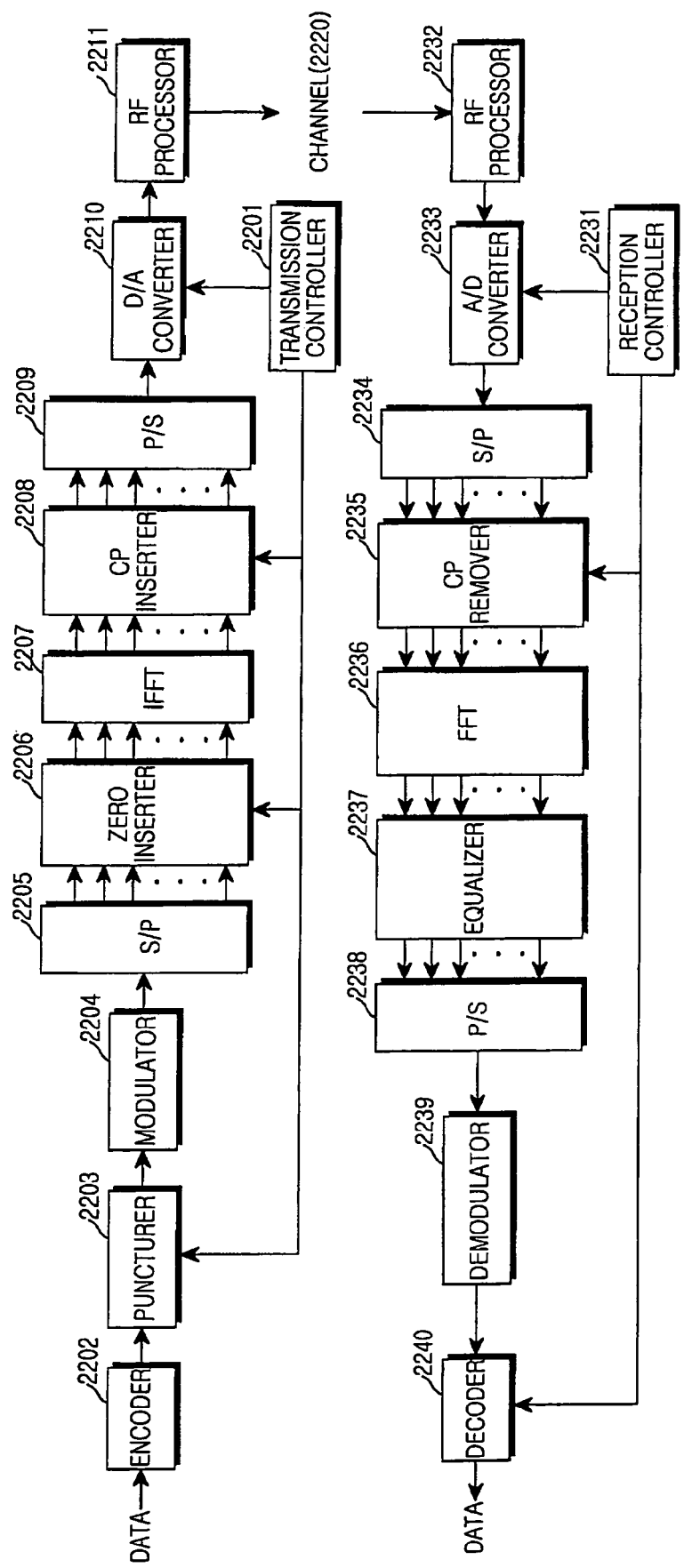
FIG. 22 is a block diagram of a transmitter and a receiver in an OFDM communication system where a CP length is variable according to an embodiment of the present invention.

FIG. 22 is a block diagram of a transmitter and a receiver in an OFDM communication system where a CP length is variable according to an embodiment of the present invention. The transmitter and the receiver are so configured as to overcome ISI by changing the CP length of an OFDM symbol on the downlink and the uplink. The transmitter corresponds to a BS and the receiver corresponds to an SS on the downlink, and vice versa on the uplink.

Referring to FIG. 22, the transmitter includes a transmission controller 2201, an encoder 2202, a puncturer 2203, a modulator 2204, an S/P converter 2205, a zero inserter 2206, an IFFT processor 2207, a CP inserter 2208, a P/S converter 2209, a D/A converter 2210, and an RF processor 2211. The receiver includes a reception controller 2231, an RF processor 2232, an A/D converter 2233, an S/P converter 2234, a CP remover 2235, an FFT processor 2236, an equalizer 2237, a P/S converter 2238, a demodulator 2239, and a decoder 2240.

For transmission from the transmitter, the transmission controller 2201 determines a CP length for an OFDM symbol according to a delay spread and controls the operations of the puncturer 2203, the zero inserter 2206, the CP inserter 2208, and the D/A converter 2210 according to the CP length. The delay spread can be obtained in many ways. For example, the transmitter itself may determine the delay spread using periodical synchronization information or ranging information received from the receiver, or using signaling information fed back from the receiver, such as a delay spread, Signal-to-Noise Ratio (SNR), Bit Error Rate (BER), or Packet Error Rate (PER). When the CP length is determined in these methods, the transmission controller 2201 provides control signals to corresponding devices so that they operate as follows.

The encoder 2202 channel-encodes input information bits at a coding rate and outputs coded bits or symbols. For k input bits and a coding rate of R, k/R symbols are output. The encoder 2202 can be a convolutional encoder, a turbo encoder, a Low Density Parity Check (LDPC) encoder, or any other encoder.

The puncturer 2203 punctures a number of symbols determined according to the CP length in the code symbols under the control of the transmission controller 2201. The puncturing pattern used is determined by the transmission controller 2201 and is notified to the receiver for use in data recovery. The puncturer 2203 may be incorporated in the encoder 2202 or separately configured. The coding rate of the encoder 2202 can be adjusted using the number of punctured bits.

The modulator 2204 maps the symbols received from the puncturer 2203 to signal points according to a modulation scheme. The modulation scheme can be Binary Phase Shift Keying (BPSK), QPSK, 8QAM, 16QAM, or 64QAM. One bit (s=1) is mapped to one signal point (complex signal) in BPSK, two bits (s=2) to one complex signal in QPSK, three bits (s=3) to one complex signal in 8QAM, four bits (s=4) to one complex signal in 16QAM, and six bits (s=6) to one complex signal in 64QAM.

The S/P converter 2205 parallelizes the serial modulation symbol sequence. For input to the IFFT processor 2207, zeroes must be inserted in the parallel symbols according to the number of punctured symbols. The number of zeroes to be inserted depends on the modulation scheme used. For BPSK that modulates one data bit to one modulation symbol, the number of zeroes is equal to the number of punctured data. For QPSK that modulates two data bits to one modulation symbol, the number of zeroes is a half of the number of punctured data. In the same manner, the number of zeroes is a third of the number of punctured data in 8QAM, a fourth of the number of punctured data in 16QAM, and a sixth of the number of punctured data in 64QAM.

In this way, the transmission controller 2201 determines the number of zeroes to be inserted and tells the zero inserter 2206 the decided number of zeroes. Notably, zeroes are inserted at the positions of subcarriers outside a set bandwidth as described with reference to FIG. 13. If subcarriers in a high frequency band are to be removed as illustrated in FIG. 13, zeroes are inserted at IFFT inputs corresponding to the high frequency band. In the case where the bandwidth overlaps other service bandwidths at both sides, zeroes are inserted at subcarrier positions in set low frequency and high frequency bands.

Thus, the zero inserter 2206 inserts a number of zeroes in the parallel data received from the S/P converter 2205 so that they are mapped to corresponding subcarriers of the IFFT processor 2207 under the control of the transmission controller 2201. In other words, the parallel data is mapped to valid subcarriers determined by the CP length and zeroes are padded at the remaining subcarriers.

As described above, in the case where the CP length is increased according to the present invention, the puncturer 2203 punctures part of coded data according to a CP length that the transmission controller 2201 tells, and the zero inserter 2206 inserts zeroes in place of the punctured data, taking into account the modulation scheme used. On the contrary, if the CP length is reduced, the puncturer 2204 punctures a reduced number of coded data or none of the coded data under the control of the transmission controller 2201, thereby increasing the number of data to be mapped to the subcarriers. The puncturer 2203 adjusts the number of coded data according to the number of subcarriers in the frequency domain calculated by Equation (5). The coded data is padded with zeroes in place of the punctured data and then IFFT-processed. The sampling rate of the resulting sample data is then adjusted. Despite the change of the sampling rate, the actual occupied bandwidth of the data is kept unchanged.

The IFFT processor 2207 IFFT-processes the zero-padded signal to time-domain sample data. The frequency of zero-padded subcarriers does not exist in the frequency domain. The CP inserter 2208 inserts a copy of a last part of the sample data as a CP before the sample data and thus outputs an OFDM symbol. The length of the CP varies under the control of the transmission controller 2201.

The P/S converter 2209 serializes the parallel data received from the CP inserter 2208. The D/A converter 2210 adjusts the sampling rate of the serial sample data and converts the adjusted data to an analog signal. The sampling rate is adjusted so that the sample interval in the time domain computed by Equation (2) is achieved. In this way, adjusting the sampling rate returns the OFDM symbol lengthened by the increased CP length to its original length irrespective of the number of actually increased data samples. That is, the OFDM symbol is fixed in length in the time domain, but has a variable CP length.

The RF processor 2211 including a filter and a front-end unit upconverts the analog signal received from the D/A converter 2210 to a transmittable RF signal, and transmits the RF signal on a radio channel through a transmit antenna. For transmission on the radio channel, the frequency band of the OFDM symbol is restricted by use of a Low Pass Filter (LPF) or a Band Pass Filter (BPF). Since frequency components beyond the limited frequency band have been eliminated from the OFDM symbol in the above-described devices, the OFDM symbol passes through the radio channel without signal distortion. Meanwhile, the signal transmitted from the transmitter experiences a multipath channel and arrives at a receive antenna of the receiver, added with noise.

For reception at the receiver, the reception controller 2231 determines control information containing the sampling rate, the CP length, and the puncturing pattern used in the transmitter, and controls the operations of the A/D converter 2233, the CP remover 2235, and the decoder 2240.

Because the sampling rate changed according to the CP length in the present invention, the reception controller 2231 must have a prior knowledge of the sampling rate used in the transmitter to recover a signal. The receiver may determine the sampling rate in many ways. For example, a few sample intervals (or sampling rates) are preset between the transmitter and the receiver and the receiver finds out the sample interval used by blind detection. If the mapping relationship among the sampling rate, the CP length, and the puncturing pattern is tabulated, the CP length and the puncturing pattern are known with the sampling rate, which obviates the need for exchanging control information between the transmitter and the receiver. For another example, the sampling rate is notified by a signaling message. Existing methods of exchanging control information between the transmitter and the receiver will not be described herein.

The RF processor 2232, including a front-end unit and a filter, downconverts the RF signal received on the radio channel to a baseband signal. The A/D converter 2233 converts the analog baseband signal to a digital signal according to a sampling rate (or time-domain sample interval) received from the reception controller 2231.

The S/P converter 2234 parallelizes the time-domain serial data received from the A/D converter 2231. The CP remover 2235 removes a CP from the parallel data based on control information received from the reception controller 2231. The FFT processor 2236 FFT-processes the CP-removed data and outputs frequency-domain data. The equalizer 2237 compensates the FFT data for noises created by the radio channel. The P/S converter 2238 converts the equalized parallel data to serial data.

The demodulator 2239 demodulates the serial data in accordance with the modulation scheme used in the transmitter. The decoder 2240 decodes the demodulated data, thus recovering the original data. Meanwhile, the reception controller 2231 provides control information relating to the type of the encoder 2202 and the puncturing pattern used to the decoder 2240 and the decoder 2240 inserts zeroes at positions of the input data stream based on the control information, for decoding.

Figure 23:
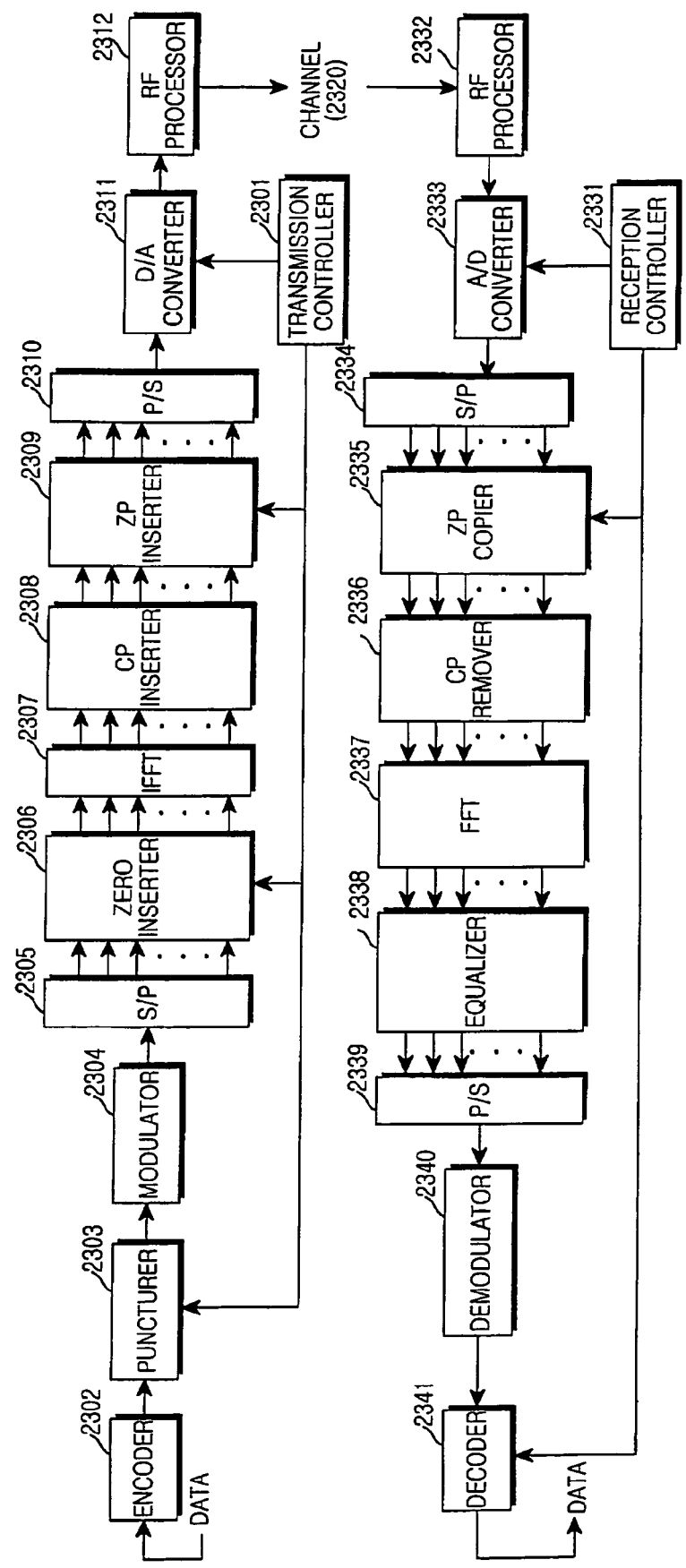
FIG. 23 is a block diagram of a transmitter and a receiver in an OFDM communication system where a ZP length is variable according to an embodiment of the present invention.

FIG. 23 is a block diagram of a transmitter and a receiver in an OFDM communication system where a ZP length is variable according to an embodiment of the present invention. The transmitter and the receiver are so configured as to overcome the ISI by changing a ZP length for an uplink OFDM symbol. Assuming the uplink, the SS serves as the transmitter and the BS serves as the receiver.

Referring to FIG. 23, the transmitter includes a transmission controller 2301, an encoder 2302, a puncturer 2303, a modulator 2304, an S/P converter 2305, a zero inserter 2306, an IFFT processor 2307, a CP inserter 2308, a ZP inserter 2309, a P/S converter 2310, a D/A converter 2311, and an RF processor 2312. The receiver includes a reception controller 2331, an RF processor 2332, an A/D converter 2333, an S/P converter 2334, a ZP copier 2335, a CP remover 2336, an FFT processor 2337, an equalizer 2338, a P/S converter 2339, a demodulator 2340, and a decoder 2341. A detailed description of the components common to the transmitters/receivers illustrated in FIGS. 22 and 23 will not be repeated here. Thus, the focus in the following description is on ZP insertion-associated devices.

For transmission from the transmitter, the transmission controller 2301 determines a ZP length for an OFDM symbol according to a delay spread and controls the operations of the puncturer 2303, the zero inserter 2306, the ZP inserter 2309, and the D/A converter 2311 according to the ZP length.

The puncturer 2303 punctures a number of symbols determined according to the ZP length in code symbols received from the encoder 2302 under the control of the transmission controller 2301. The puncturing pattern used is determined by the transmission controller 2301 and is notified to the receiver for use in data recovery.

The zero inserter 2306 inserts a number of zeroes in the parallel data received from the S/P converter 2305 so that the zeros are mapped to corresponding subcarriers of the IFFT processor 2307 under the control of the transmission controller 2301. In other words, the parallel data is mapped to valid subcarriers determined by the ZP length and zeroes are padded at the remaining subcarriers.

The ZP inserter 2309 inserts a ZP being time samples with zeroes after an OFDM symbol received from the CP inserter 2308 and outputs a final OFDM symbol. The P/S converter 2310 converts the parallel ZP-inserted data to serial data.

The D/A converter 2311 adjusts the sampling rate of the serial sample data and converts the adjusted data to an analog signal. The RF processor 2312 upconverts the analog signal received from the D/A converter 2311 to a transmittable RF signal, and transmits the RF signal on a radio channel through a transmit antenna. The signal transmitted from the transmitter experiences a multipath channel and arrives at a receive antenna of the receiver, with added noise.

For reception at the receiver, the reception controller 2331 determines control information containing the sampling rate, the ZP length, and the puncturing pattern used in the transmitter, and controls the operations of the A/D converter 2333, the ZP copier 2335, and the decoder 2341.

The A/D converter 2333 converts an analog baseband signal received from the RF processor 2332 to a digital signal according to the sampling rate received from the reception controller 2331. The S/P converter 2334 converts the time-domain serial data to parallel data.

The ZP copier 2335 copies the ZP of the parallel data and inserts the ZP after the CP.

The decoder 2341 inserts zeroes at positions of an input data stream according to the puncturing pattern and decodes the zero-inserted data under the control of the controller 2331.

Figure 24:
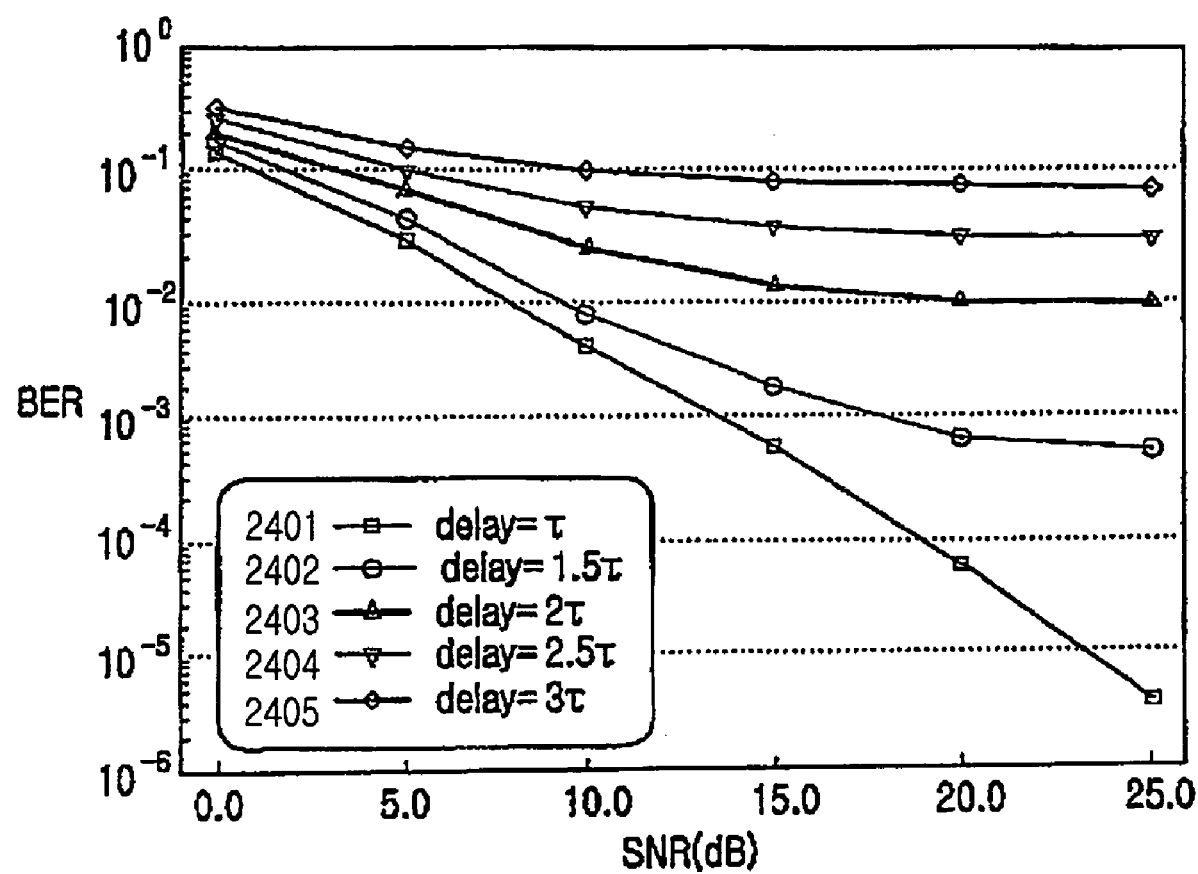
FIG. 24 is a graph illustrating the simulated results of link performance degradation caused by multipath components in the OFDM communication system.

FIG. 24 is a graph illustrating the simulated results of link performance degradation caused by multipath components in the OFDM communication system. The simulation conditions are an FFT size of 64, a CP length $\tau$ being an eighth of a valid symbol, a rate 1/2 convolutional encoder, a valid symbol length of 64 μs, and a Rayleigh channel with two equal-power paths.

A first curve 2401 represents performance (i.e. signal to noise ratio)SNR) versus bit error rate (BER)) in the case where the multipath channel experiences no delay or has a delay equal to a maximum CP length $\tau$. Second to fifth curves 2402 to 2405 represent performance in the cases where the multipath delay is 1.5 times, 2 times, 2.5 times, and 3 times the CP length $\tau$, respectively. As denoted from the curves, performance degradation becomes more serious as the multipath delay increases, thereby making demodulation difficult at the receiver.

Figure 25:
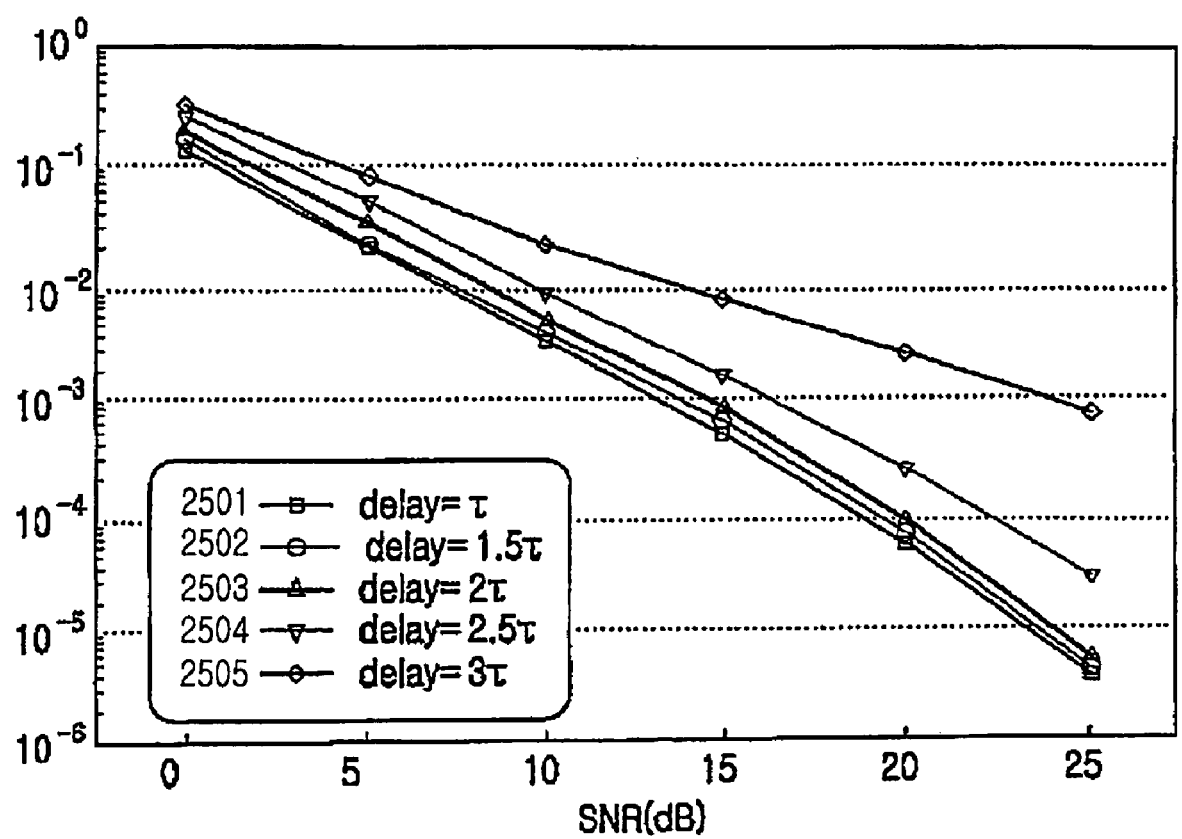
FIG. 25 is a graph illustrating improved performance when a CP length is adjusted according to the present invention.

FIG. 25 is a graph illustrating improved performance when a CP length is adjusted according to the present invention. A comparison between curves with the same multipath delay in FIGS. 24 and 25, that is, between curves 2401 and 2501, curves 2402 and 2502, curves 2403 and 2503, curves 2404 and 2504, and curves 2405 and 2505, reveals that CP adjustment according to the present invention improves link performance remarkably for higher signal strength.

In accordance with the present invention as described above, ISI-caused serious data errors arising from multipath delay at the receiver can be prevented by adaptively changing an OFDM symbol configuration according to a delay spread. That is, improved system performance increases system capacity. Furthermore, despite the change of the OFDM symbol configuration, the OFDM symbol is kept at a fixed length in time, transmitter/receiver complexity is eliminated, which otherwise might be caused by the change of OFDM symbol length.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitter in a broadband wireless communication system, comprising:
   a controller for determining a cyclic prefix (CP) length, a puncturing pattern, and a time sample interval according to a delay spread;
   a puncturer for puncturing coded data according to the puncturing pattern;
   an inverse fast Fourier transform (IFFT) processor for IFFT-processing the punctured coded data and outputting sample data;
   a CP inserter for generating an orthogonal frequency division multiplexing (OFDM) symbol by inserting a copy of a last part of the sample data before the sample data, the last part of the sample data being equal in length to the CP length; and
   a digital-to-analog (D/A) converter for converting the OFDM symbol to an analog signal at a sampling rate determined by the time sample interval.

2. The transmitter of claim 1, further comprising a zero inserter for mapping the punctured coded data to valid subcarriers determined by the sampling rate among subcarriers of the IFFT processor, and padding zeroes at the remaining subcarriers.

3. The transmitter of claim 1, wherein the number of the valid subcarriers $N'_{FFT}$ to which the punctured coded data is mapped is computed by $$N'_{FFT} = \text{floor}\left(\frac{BW_1}{\Delta f_2}\right)$$

where $BW_1$ denotes an occupied bandwidth before the CP length is changed and $\alpha f_2$ denotes a subcarrier spacing after the CP length is changed.

4. The transmitter of claim 1, wherein the time sample interval ΔT is determined by $$\Delta T = \frac{T - MT_c}{N_{FFT}}$$

where T denotes the length of the OFDM symbol, $N_{FFT}$ denotes a fast Fourier transform (FFT) size, $T_c$ denotes a CP length before changing, and $MT_c$ denotes a CP length after changing.

5. The transmitter of claim 1, wherein the coded data results from channel coding and modulation.

6. The transmitter of claim 1, wherein the delay spread is received from a receiver and the controller calculates the CP length, the puncturing pattern, and the time sample interval using the received delay spread.

7. The transmitter of claim 1, wherein at least one of the CP length, the puncturing pattern, and the time sample interval is received from the receiver.

8. A receiver in a broadband wireless communication system, comprising:
- a controller for determining a cyclic prefix (CP) length and a sampling rate according to a delay spread;
- an analog-to-digital (A/D) converter for converting a received analog signal to time sample data at the sampling rate;
- a CP remover for removing a CP from the time sample data according to the CP length; and
- a fast Fourier transform (FTT) processor for FFT-processing the CP-removed sample data and outputting frequency-domain data.

9. The receiver of claim 8, further comprising:
- a demodulator for demodulating the frequency-domain data; and
- a decoder for inserting zeroes in the demodulated data according to a puncturing pattern determined by the delay spread, and decoding the zero-inserted data.

10. The receiver of claim 8, wherein the CP length is either received from a transmitter by a signaling message or determined using a time sample interval detected by blind detection.

11. A transmission method in a broadband wireless communication system, comprising the steps of:
- determining a cyclic prefix (CP) length, a puncturing pattern, and a time sample interval according to a delay spread;
- puncturing coded data in the puncturing pattern;
- generating sample data by inverse fast Fourier transform (IFFT)-processing the punctured coded data;
- generating an orthogonal frequency division multiplexing (OFDM) symbol by inserting a copy of a last part of the sample data before the sample data, the last part of the sample data being equal in length to the CP length; and
- converting the OFDM symbol to an analog signal at a sampling rate determined by the time sample interval, and transmitting the analog signal.

12. The transmission method of claim 11, wherein the sample data generation step comprises the step of mapping the punctured coded data to valid subcarriers determined by the sampling rate, padding zeroes at the remaining subcarriers, and IFFT-processing the punctured coded data with the zeroes.

13. The transmission method of claim 11, wherein the number of the valid subcarriers $N'_{FFT}$ to which the punctured coded data is mapped is computed by $$N'_{FFT} = \text{floor}\left(\frac{BW_1}{\Delta f_2}\right)$$

where $BW_1$ denotes an occupied bandwidth before the CP length is changed and $\Delta f_2$ denotes a subcarrier spacing after the CP length is changed.

14. The transmission method of claim 11, wherein the time sample interval ΔT is determined by $$\Delta T = \frac{T - MT_c}{N_{FFT}}$$

where T denotes the length of the OFDM symbol, $N_{FFT}$ denotes a fast Fourier transform (FFT) size, $T_c$ denotes a CP length before changing, and $MT_c$ denotes a CP length after changing.

15. The transmission method of claim 11, wherein the coded data results from channel coding and modulation.

16. The transmission method of claim 11, wherein the determining step comprises the step of receiving the delay spread from a receiver and calculating the CP length, the puncturing pattern, and the time sample interval using the received delay spread.

17. The transmission method of claim 11, wherein the acquisition step comprises the step of receiving at least one of the CP length, the puncturing pattern, and the time sample interval from the receiver.

18. A transmission method in a broadband wireless communication system, comprising the steps of:
- determining a delay spread with respect to a receiver;
- generating an OFDM symbol by increasing a current cyclic prefix (CP) length if the delay spread is longer than the current CP length; and
- decreasing a sample interval of the OFDM symbol to maintain the OFDM symbol at a fixed length in time,
- wherein the sample interval ΔT is determined by $$\Delta T = \frac{T - MT_c}{N_{FFT}}$$

where T denotes the length of the OFDM symbol, $N_{FFT}$ denotes a fast Fourier transform (FFT) size, $T_c$ denotes the current CP length, and $MT_c$ denotes the increased CP length.

19. A transmitter in a broadband wireless communication system, comprising:
- a controller for determining a zero postfix (ZP) length, a puncturing pattern, and a time sample interval according to a delay spread;
- a puncturer for puncturing coded data in the puncturing pattern;
- an inverse fast Fourier transform (IFFT) processor for IFFT-processor the punctured coded data and outputting sample data;
- a cyclic prefix (CP) inserter for inserting a CP in the sample data;
- a ZP inserter for generating an orthogonal frequency division multiplexing (OFDM) symbol by inserting zero samples of the ZP length after the CP-inserted sample data; and a digital-to-analog (D/A) converter for converting the OFDM symbol to an analog signal at a sampling rate determined by the time sample interval.

20. The transmitter of claim 19, further comprising a zero inserter for mapping the punctured coded data to valid subcarriers determined by the sampling rate among subcarriers of the IFFT processor, and padding zeroes at the remaining subcarriers.

21. The transmitter of claim 19, wherein the time sample interval ΔT' is determined by $$\Delta T' = \frac{T - T_c - T_{ZP}}{N_{FFT}}$$

where T denotes the length of the OFDM symbol, $T_c$ denotes a CP length, and $T_{ZP}$ denotes the ZP length, and $N_{FFT}$ denotes a fast Fourier transform (FFT) size.

22. The transmitter of claim 21, wherein the number of the inserted zero samples $N_{ZP}$ is computed by $$N_{ZP} = \frac{T - T'_d - T'_c}{\Delta T'}$$

where ΔT' denotes a changed time sample interval, $T_c'$ denotes a changed CP length, and $T_d'$ denotes a changed data interval.

23. The transmitter of claim 19, wherein the number of the valid subcarriers $N'_{FFT}$ to which the punctured coded data is mapped is computed by $$N'_{FFT} = \text{floor}\left(\frac{BW_1}{\Delta f_2}\right)$$

where $BW_1$ denotes an occupied bandwidth before the ZP length is changed and $\Delta f_2$ denotes a subcarrier spacing after the ZP length is changed.

24. The transmitter of claim 19, wherein the coded data results from channel coding and modulation.

25. The transmitter of claim 19, wherein the delay spread is received from a receiver and the controller calculates the ZP length, the puncturing pattern, and the time sample interval using the received delay spread.

26. The transmitter of claim 19, wherein at least one of the ZP length, the puncturing pattern, and the time sample interval is received from the receiver.

27. A receiver in a broadband wireless communication system, comprising:
a controller for determining a zero postfix (ZP) length and a sampling rate according to a delay spread;
an analog-to-digital (A/D) converter for converting a received analog signal to time sample data at the sampling rate;
a ZP copier for copying samples of the ZP length from the end of the time sample data and inserting the copied samples after a cyclic prefix (CP) of the time sample data;
a CP remover for removing the CP from the ZP-inserted sample data; and
a fast Fourier transform (FFT) processor for FFT-processing the CP-removed sample data and outputting frequency-domain data.

28. The receiver of claim 27, further comprising:
a demodulator for demodulating the frequency-domain data; and
a decoder for inserting zeroes in the demodulated data according to a puncturing pattern determined by the delay spread and decoding the zero-inserted data.

29. The receiver of claim 27, wherein the ZP length is either received from a transmitter by a signaling message or determined using a time sample interval detected by blind detection.

30. A transmission method in a broadband wireless communication system, comprising the steps of:
determining a zero postfix (ZP) length, a puncturing pattern, and a time sample interval according to a delay spread;
puncturing coded data in the puncturing pattern;
generating sample data by inverse fast Fourier transform (IFFT)-processing the punctured coded data;
inserting a cyclic prefix (CP) in the sample data;
generating an orthogonal frequency division multiplexing (OFDM) symbol by inserting zero samples of the ZP length after the CP-inserted sample data; and
converting the OFDM symbol to an analog signal at a sampling rate determined by the time sample interval and transmitting the analog signal.

31. The transmission method of claim 30, wherein the same data generation step comprises the step of mapping the punctured coded data to valid subcarriers determined by the sampling rate, and padding zeroes at the remaining subcarriers.

32. The transmission method of claim 30, wherein the time sample interval ΔT' is determined by $$\Delta T' = \frac{T - T_c - T_{ZP}}{N_{FFT}}$$

where T denotes the length of the OFDM symbol, $T_c$ denotes a CP length, and $T_{ZP}$ denotes the ZP length, and $N_{FFT}$ denotes a fast Fourier transform (FFT) size.

33. The transmission method of claim 32, wherein the number of the inserted zero samples $N_{ZP}$ is computed by $$N_{ZP} = \frac{T - T'_d - T'_c}{\Delta T'}$$

where ΔT' denotes a changed time sample interval, $T_c'$ denotes a changed CP length, and $T_d'$ denotes a changed data interval.

34. The transmission method of claim 30, wherein the number of the valid subcarriers $N'_{FFT}$ to which the punctured coded data is mapped is computed by $$N'_{FFT} = \text{floor}\left(\frac{BW_1}{\Delta f_2}\right)$$

where $BW_1$ denotes an occupied bandwidth before the ZP length is changed and $\Delta f_2$ denotes a subcarrier spacing after the ZP length is changed.

35. The transmission method of claim 30, wherein the coded data results from channel coding and modulation.

36. The transmission method of claim 30, wherein the determination step comprises the step of receiving the delay spread from a receiver and calculating the ZP length, the puncturing pattern, and the time sample interval using the received delay spread.

37. The transmission method of claim 30, wherein the acquisition step comprises the step of receiving at least one of the ZP length, the puncturing pattern, and the time sample interval from the receiver.

38. A reception method in a broadband wireless communication system, comprising the steps of:
   determining a zero postfix (ZP) length and a sampling rate according to a delay spread;
   converting a received analog signal to time sample data at the sampling rate;
   copying samples of the ZP length from the end of the time sample data and inserting the copied samples after a cyclic prefix (CP) of the time sample data;
   removing the CP from the ZP-inserted sample data; and
   generating frequency-domain data by fast Fourier transform (FFT)-processing the CP-removed sample data.

39. The reception method of claim 38, further comprising the steps of:
   demodulating the frequency-domain data; and
   inserting zeroes in the demodulated data according to a puncturing pattern determined by the delay spread and decoding the zero-inserted data.

40. The reception method of claim 38, wherein the determination step comprises the step of either receiving the ZP length from a transmitter by a signaling message or determining the ZP length using a time sample interval detected by blind detection.

41. A transmission method in a broadband wireless communication system, comprising the steps of:
   determining a delay spread with respect to a receiver;
   determining the length of a zero postfix (ZP) to be inserted after an orthogonal frequency division multiplexing (OFDM) symbol if the delay spread is longer than a current cyclic prefix (CP) length;
   changing a sample interval according to the ZP length;
   generating an OFDM symbol to be transmitted;
   updating the OFDM symbol by inserting as many zero samples as extra samples made available by changing the sample interval; and
   converting the updated OFDM symbol to an analog signal at a sample rate determined by the changed sample interval.

42. The transmission method of claim 41, wherein the sample interval $\Delta T'$ is determined by $$\Delta T' = \frac{T - T_c - T_{ZP}}{N_{FFT}}$$

where T denotes the length of the OFDM symbol, $T_c$ denotes the CP length, and $T_{ZP}$ denotes the ZP length, and $N_{FFT}$ denotes a fast Fourier transform (FFT) size.

* * * * *